United States Patent
Kato

(10) Patent No.: US 10,453,403 B2
(45) Date of Patent: Oct. 22, 2019

(54) DISPLAY DEVICE

(71) Applicant: Japan Display Inc., Tokyo (JP)

(72) Inventor: Hirofumi Kato, Tokyo (JP)

(73) Assignee: Japan Display Inc., Tokyo (JP)

( * ) Notice: Subject to any disclaimer, the term of this patent is extended or adjusted under 35 U.S.C. 154(b) by 44 days.

(21) Appl. No.: 15/846,782

(22) Filed: Dec. 19, 2017

(65) Prior Publication Data

US 2018/0211610 A1 Jul. 26, 2018

(30) Foreign Application Priority Data

Jan. 23, 2017 (JP) ................................ 2017-009535

(51) Int. Cl.
*G09G 3/34* (2006.01)
*G02F 1/1334* (2006.01)
(Continued)

(52) U.S. Cl.
CPC ........... *G09G 3/3413* (2013.01); *G02F 1/137* (2013.01); *G02F 1/1334* (2013.01); *G02F 1/133621* (2013.01); *G02F 1/134309* (2013.01); *G09G 3/2092* (2013.01); *G09G 3/342* (2013.01); *G09G 3/3611* (2013.01); *G09G 3/3614* (2013.01); *G09G 3/3648* (2013.01); *G09G 3/3655* (2013.01); *G02F 2001/13347* (2013.01); *G02F 2001/133622* (2013.01); *G02F 2201/121* (2013.01); *G09G 2300/0478* (2013.01); *G09G 2310/08* (2013.01); *G09G 2320/062* (2013.01); *G09G 2320/064* (2013.01); *G09G 2320/0666* (2013.01)

(58) Field of Classification Search
CPC ............. G02F 1/1334; G02F 1/133621; G02F 1/134309; G02F 1/137; G02F 2001/13347; G02F 2001/133622; G02F 2201/121; G09G 2300/0478; G09G 2310/08; G09G 2320/062; G09G 2320/064; G09G 2320/0666; G09G 3/2092; G09G 3/3413; G09G 3/342; G09G 3/3611; G09G 3/3614; G09G 3/3648; G09G 3/3655
See application file for complete search history.

(56) References Cited

U.S. PATENT DOCUMENTS

2005/0232573 A1\* 10/2005 Iwauchi ............... G02B 6/0033
  385/147
2006/0256069 A1\* 11/2006 Okazaki ............... G09G 3/3655
  345/102

(Continued)

FOREIGN PATENT DOCUMENTS

| JP | 2003-219435 A | 7/2003 |
| JP | 2010-149734 A | 7/2010 |
| WO | 2014/017344 A | 1/2014 |

*Primary Examiner* — Viet D Pham
(74) *Attorney, Agent, or Firm* — K&L Gates LLP

(57) ABSTRACT

According to one embodiment, a display device includes a display panel, a light source unit, and a controller which controls the display panel and the light source unit, wherein the controller applies scattering voltage between a common electrode and a first pixel electrode in a first area and between the common electrode and a second pixel electrode in a second area, and a liquid crystal layer scatters light in a first display color in the first area, and scatters light in a second display color different from the first display color in the second area.

14 Claims, 26 Drawing Sheets

(51) Int. Cl.
  *G02F 1/137*   (2006.01)
  *G02F 1/1343*  (2006.01)
  *G02F 1/1335*  (2006.01)
  *G09G 3/36*    (2006.01)
  *G09G 3/20*    (2006.01)

(56) References Cited

U.S. PATENT DOCUMENTS

2009/0315476 A1* 12/2009 Baaijens .............. H05B 33/086
                                                    315/291
2012/0274624 A1* 11/2012 Lee ..................... G09G 3/3648
                                                    345/213
2014/0253533 A1*  9/2014 Miyake ................ G09G 3/3655
                                                    345/212
2015/0325163 A1   11/2015 Kobayashi
2016/0109740 A1*  4/2016 Lee ..................... G02F 1/13306
                                                    345/207

* cited by examiner

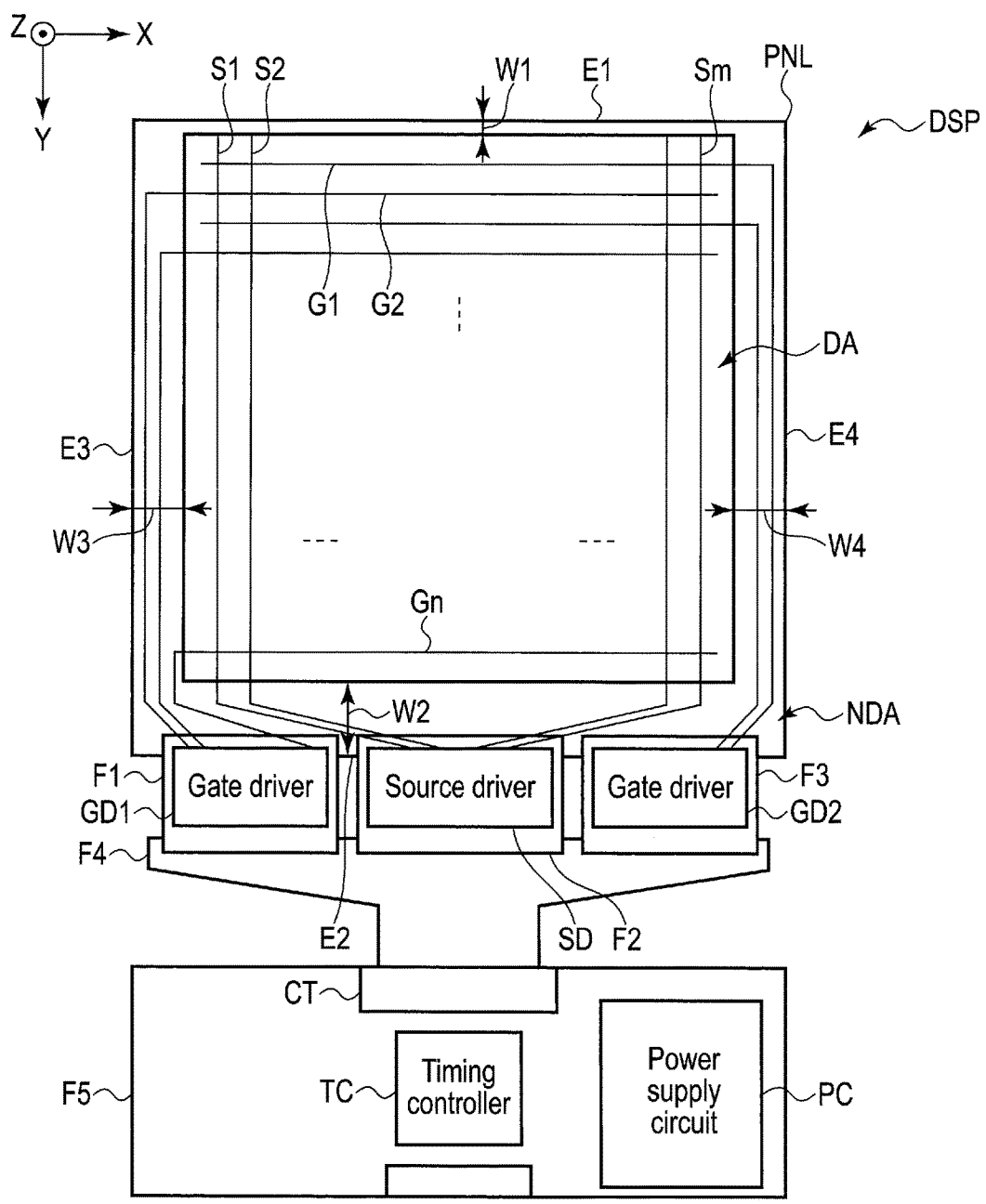
F I G. 1

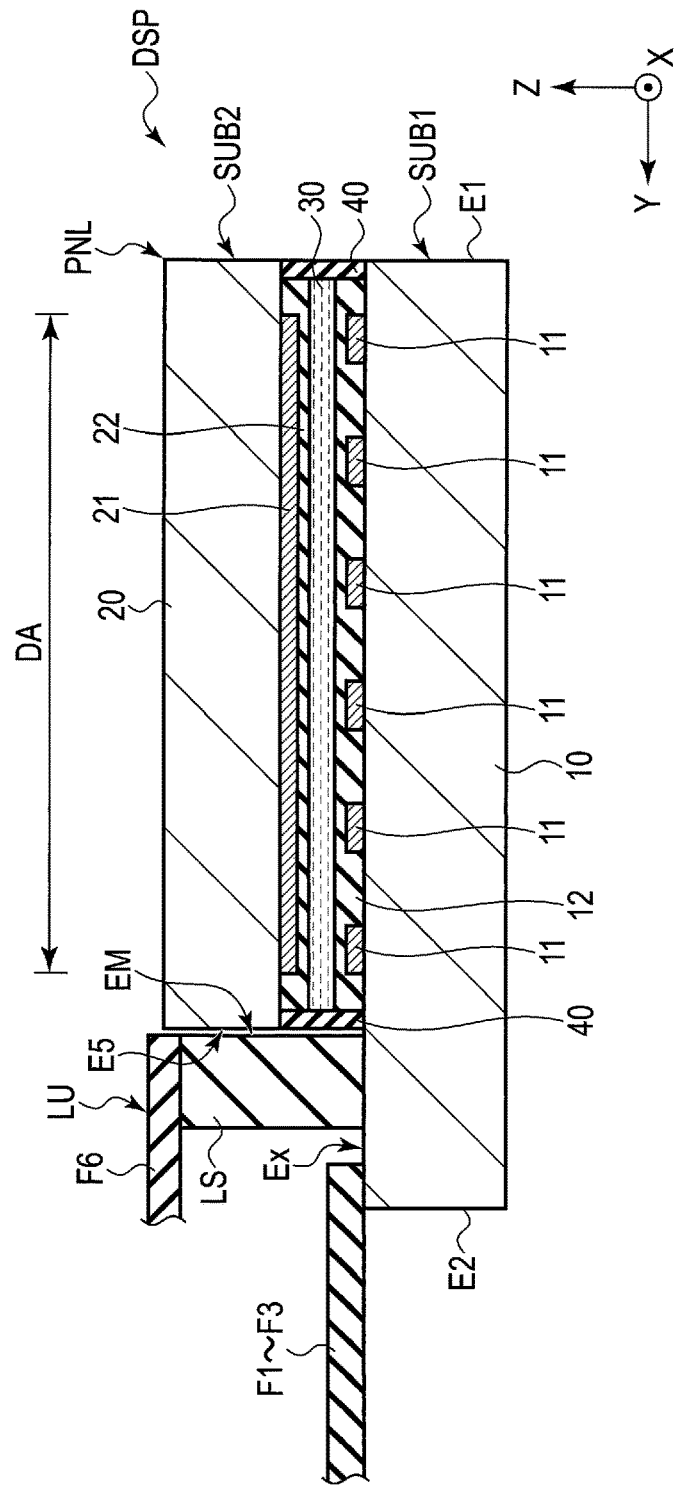
F I G. 2

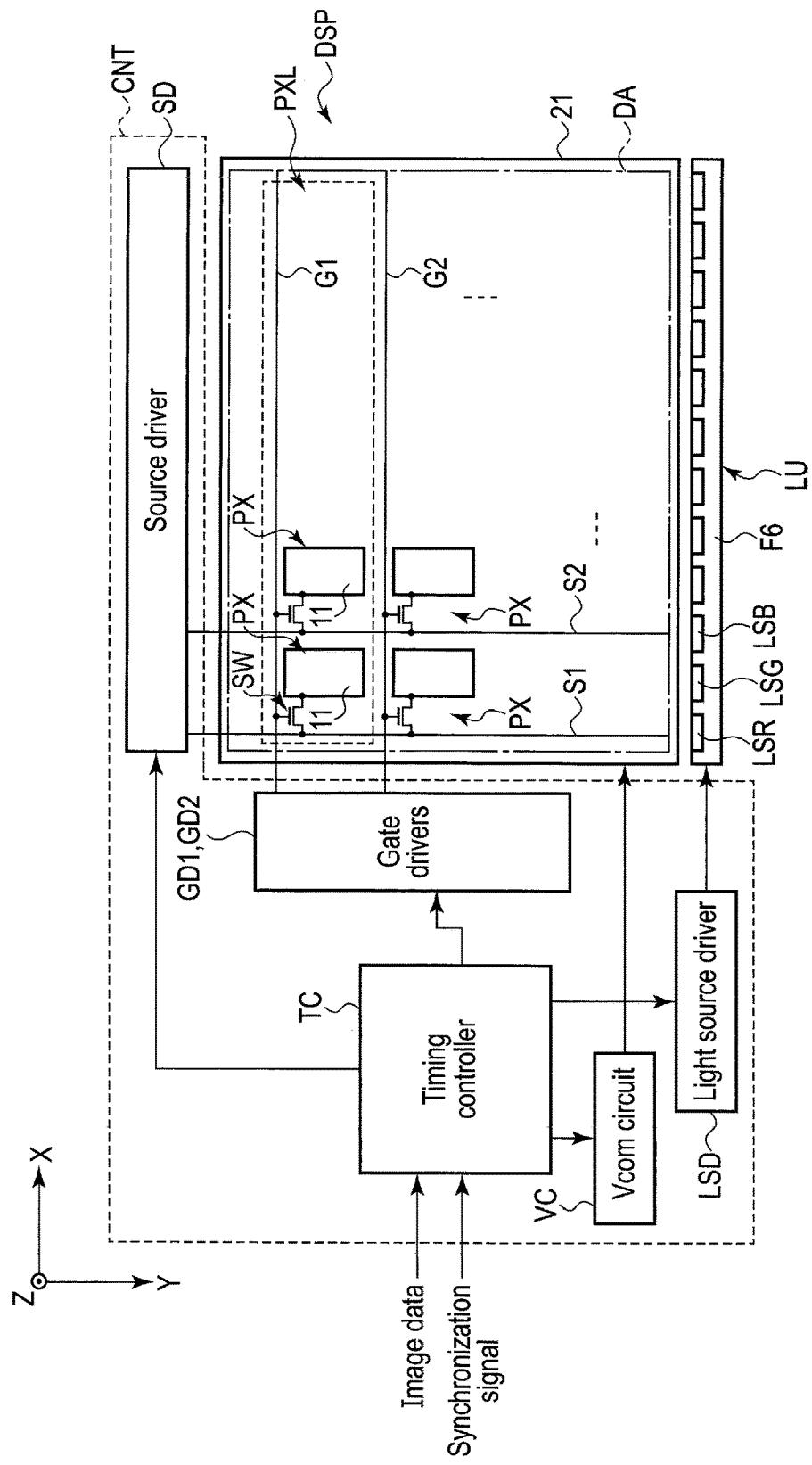
F I G. 3

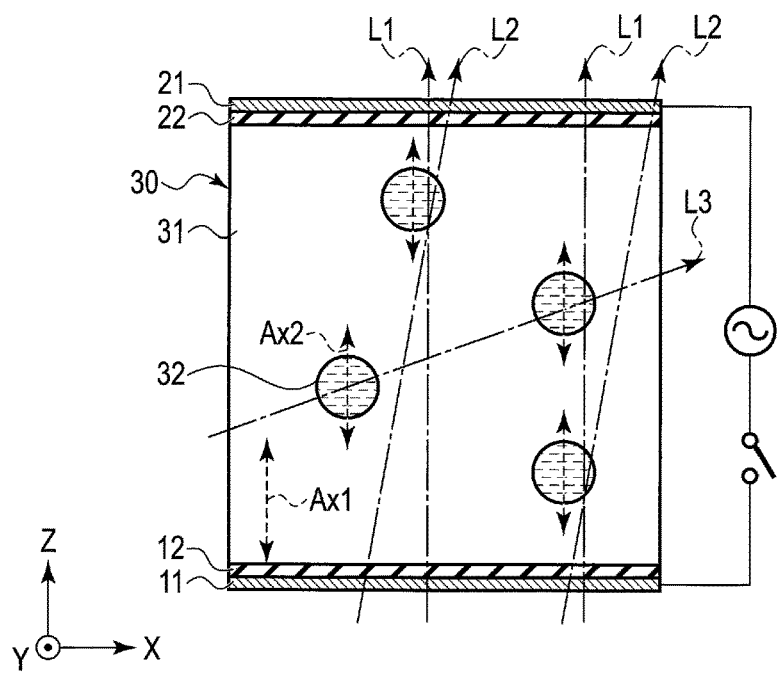
F I G. 4A
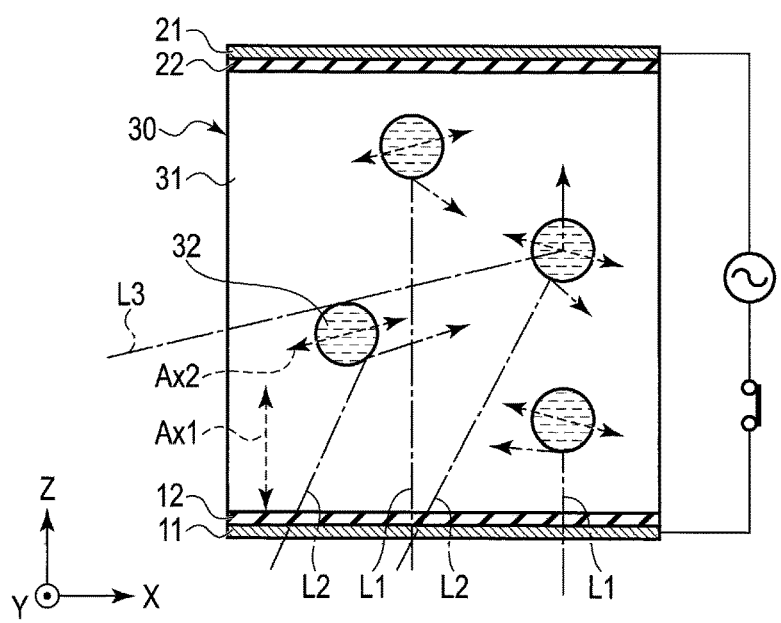
F I G. 4B

| First display color C1 | Second display color C2 |
|---|---|
| Red | Blue |
| Green | Blue |
| Blue | Green |
| Cyan | Blue |
| Magenta | Green |
| Yellow | Blue |

| First number of pixel lines (m) | Second number of pixel lines (n1) | Third number of pixel lines (n2) |
|---|---|---|
| ⋮ | ⋮ | ⋮ |

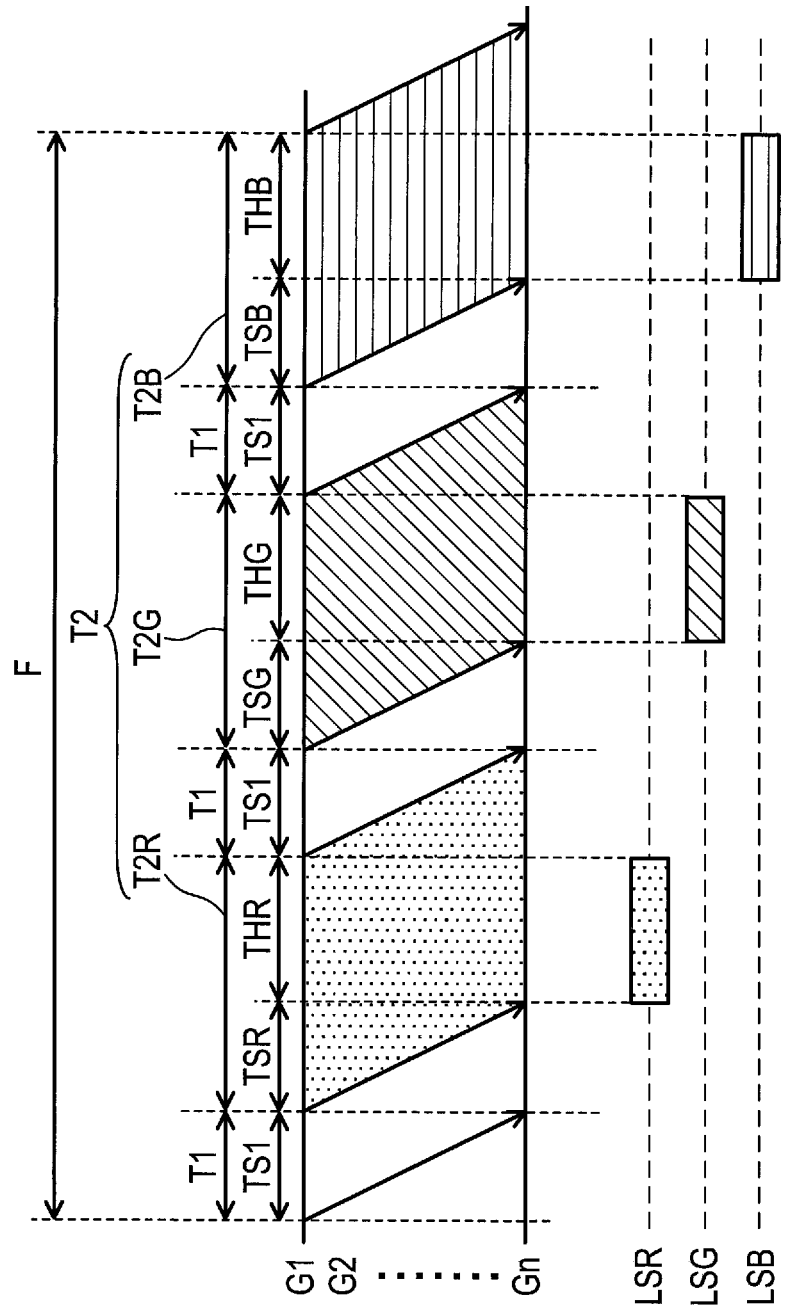
F I G. 18

| First number of pixel lines (m) | Second number of pixel lines (n1) | Third number of pixel lines (n2) | First number of pixels (n3) | Second number of pixels (n4) |
|---|---|---|---|---|
| ...... | ...... | ...... | ...... | ...... |

TB3

F I G. 25

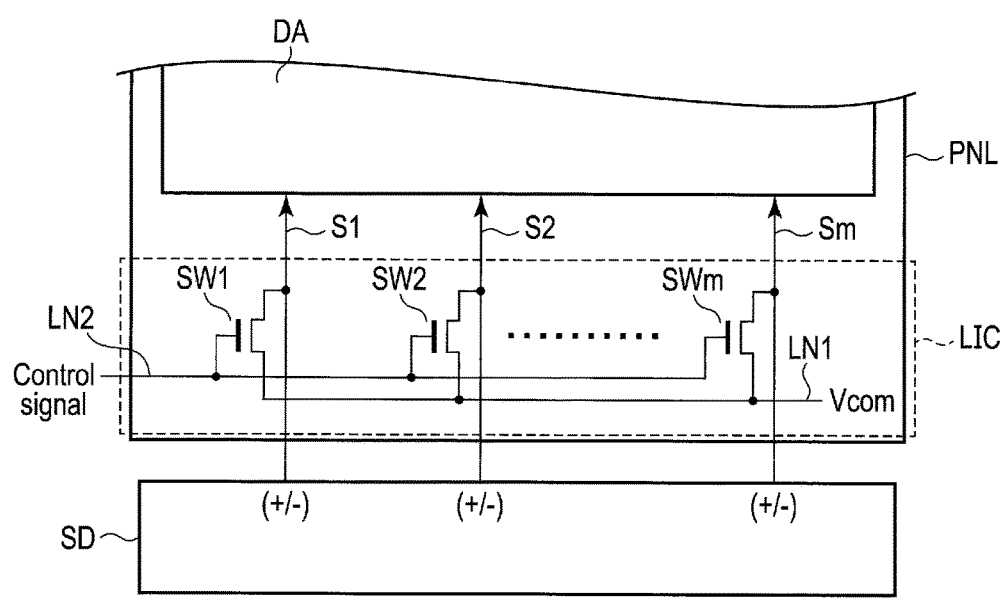
F I G. 28

US 10,453,403 B2

DISPLAY DEVICE

CROSS-REFERENCE TO RELATED APPLICATIONS

This application is based upon and claims the benefit of priority from Japanese Patent Application No. 2017-009535, filed Jan. 23, 2017, the entire contents of which are incorporated herein by reference.

FIELD

Embodiments described herein relate generally to a display device.

BACKGROUND

In recent years, the following display device has been suggested. The display device includes a polymer dispersed liquid crystal (PDLC) panel capable of switching the state between a diffusing state for diffusing incident light and a transmitting state for transmitting incident light. While the display device is capable of displaying an image, the user can view the background through the display device. In the display device, each frame period comprises a plurality of sub-frame periods. The display device realizes multicolor display by displaying an image while the display color is switched for each sub-frame period.

SUMMARY

The present application generally relates to a display device.

According to one embodiment, a display device includes a display panel, a light source unit, and a controller which controls the display panel and the light source unit, wherein the controller applies scattering voltage between a common electrode and a first pixel electrode in a first area and between the common electrode and a second pixel electrode in a second area, and a liquid crystal layer scatters light in a first display color in the first area, and scatters light in a second display color different from the first display color in the second area.

BRIEF DESCRIPTION OF THE DRAWINGS

FIG. 1 is a plan view showing a structural example of a display device according to a first embodiment.

FIG. 2 is a cross-sectional view of the display device shown in FIG. 1.

FIG. 3 shows the main structural components of the display device shown in FIG. 1.

FIG. 4A schematically shows a liquid crystal layer in a transparent state.

FIG. 4B schematically shows the liquid crystal layer in a scattering state.

FIG. 18 is a timing chart showing another example of display operation.

FIG. 25 shows an example of a third table TB3.

FIG. 28 shows a structural example of a Vcom lead-in circuit.

DETAILED DESCRIPTION

Figure 5A:
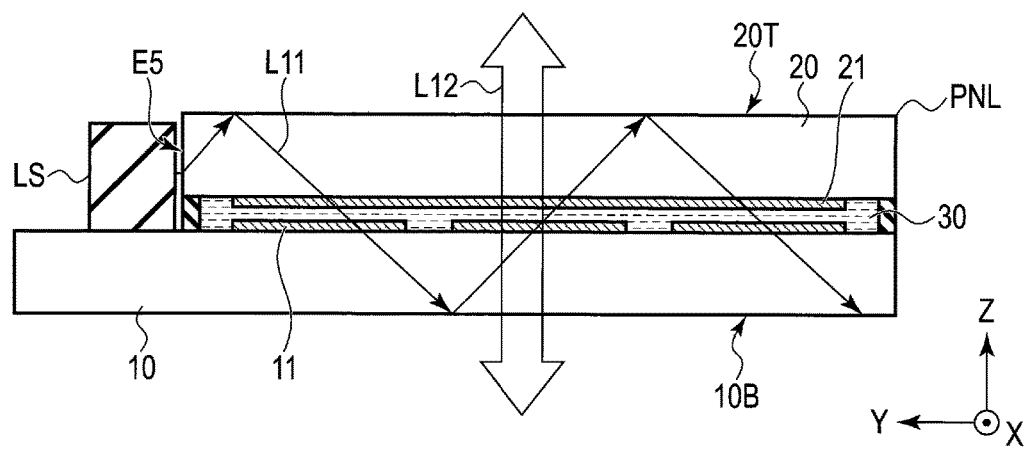
FIG. 5A is a cross-sectional view showing a display panel when the liquid crystal layer is in a transparent state.

In general, according to one embodiment, a display device includes:

a display panel comprising: a display area comprising a first area and a second area surrounding the first area; a first pixel electrode located in the first area; a second pixel electrode located in the second area; a common electrode located in the display area; and a liquid crystal layer located in the display area and including a polymer dispersed liquid crystal;

a light source unit comprising: a first light source which emits light in a first color toward the display panel; and a second light source which emits light in a second color different from the first color toward the display panel; and a controller which controls the display panel and the light source unit, wherein the controller applies scattering voltage between the common electrode and the first pixel electrode and between the common electrode and the second pixel electrode, and controls the light source unit, and the liquid crystal layer scatters light in a first display color in the first area, and scatters light in a second display color different from the first display color in the second area.

Various embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In each embodiment, as an example of a display device, a display device to which a polymer dispersed liquid crystal is applied is explained. The display device of each embodiment may be applied to various devices such as a smartphone, a tablet and a mobile phone.

First Embodiment

FIG. 1 is a plan view showing a structural example of a display device DSP according to the present embodiment. In FIG. 1, a first direction X intersects a second direction Y. A third direction Z intersects the first direction X and the second direction Y. For example, the first direction X, the second direction Y and the third direction Z are perpendicular to one another. However, they may intersect one another at an angle other than 90 degrees.

The display device DSP comprises a display panel PNL, circuit boards (wiring substrates) F1 to F5, etc. The display panel PNL comprises a display area DA for displaying an image, and a frame-shaped non-display area NDA surrounding the display area DA. The display area DA comprises n scanning lines G (G1 to Gn), m signal lines S (S1 to Sm), etc. Both n and m are positive integers, where n may be equal to m, or n may be different from m. The scanning lines G extend in the first direction X, and are arranged at intervals in the second direction Y. The signal lines S extend in the second direction Y, and are arranged at intervals in the first direction X.

The display panel PNL comprises edge portions E1 and E2 extending in the first direction X, and edge portions E3 and E4 extending in the second direction Y. With respect to the width of the non-display area NDA, width W1 between the edge portion E1 and the display area DA in the second direction Y is less than width W2 between the edge portion E2 and the display area DA in the second direction Y. Width W3 between the edge portion E3 and the display area DA in the first direction X is substantially equal to width W4 between the edge portion E4 and the display area DA in the first direction X. Both width W3 and width W4 are less than width W2. Both width W3 and width W4 may be substantially equal to width W1, or may be different from width W1.

The circuit boards F1 to F3 are arranged in this order in the first direction X. The circuit board F1 comprises a gate driver GD1. The circuit board F2 comprises a source driver SD. The circuit board F3 comprises a gate driver GD2. The circuit boards F1 to F3 are connected to the display panel PNL and the circuit board F4. The circuit board F5 comprises a timing controller TC, a power supply circuit PC, etc. The circuit board F4 is connected to a connector CT provided in the circuit board F5. The circuit boards F1 to F3 may be replaced by a single circuit board. The circuit boards F1 to F4 may be replaced by a single circuit board.

In the example shown in FIG. 1, the odd-numbered scanning lines G from the edge portion E1 side are electrically connected to the gate driver GD2, and the even-numbered scanning lines G are electrically connected to the gate driver GD1. However, the connection relationships of the gate drivers GD1 and GD2 and the scanning lines G are not limited to the example shown in FIG. 1.

FIG. 2 is a cross-sectional view of the display device DSP shown in FIG. 1. Here, this specification merely explains the main part of a section of the display device DSP in the Y-Z plane defined by the second direction Y and the third direction Z.

The display panel PNL comprises a first substrate SUB1, a second substrate SUB2, a liquid crystal layer 30 as a display function layer, etc. The first substrate SUB1 comprises a transparent substrate 10, pixel electrodes 11, an alignment film 12, etc. The second substrate SUB2 comprises a transparent substrate 20, a common electrode 21, an alignment film 22, etc. The pixel electrodes 11 and the common electrode 21 are formed of a transparent conductive material such as indium tin oxide (ITO) or indium zinc oxide (IZO). The liquid crystal layer 30 is located at least in the display area DA. The liquid crystal layer 30 includes a polymer dispersed liquid crystal, and is located between the alignment films 12 and 22. The liquid crystal layer 30 of the present embodiment uses a reverse mode polymer dispersed liquid crystal (R-PDLC). The liquid crystal layer 30 maintains the parallelism of incident light when the applied voltage is lower than predetermined voltage. The liquid crystal layer 30 scatters incident light when the applied voltage is higher than predetermined voltage. The first substrate SUB1 is attached to the second substrate SUB2 with a sealant 40. The first substrate SUB1 comprises an extension portion EX extending in the second direction Y in comparison with an edge portion E5 of the transparent substrate 20.

The circuit boards F1 to F3 are connected to the extension portion EX of the first substrate SUB1.

A light source unit LU comprises a light-emitting element LS as a light source, a circuit board F6, etc. The light-emitting element LS emits light toward the display panel PNL or the liquid crystal layer 30. The light-emitting element LS is connected to the circuit board F6, and is located on the extension portion EX. The light-emitting element LS comprises a light-emitting portion EM facing the edge portion E5. As described later, the illumination light emitted from the light-emitting portion EM enters the display panel PNL through the edge portion E5, and is propagated through the display panel PNL.

FIG. 3 shows the main structural components of the display device DSP shown in FIG. 1.

The display device DSP comprises a controller CNT. The controller CNT is indicated by a dashed line in FIG. 3. The controller CNT includes the timing controller TC, the gate drivers GD1 and GD2, the source driver SD, a Vcom circuit VC, a light source driver LSD, etc.

The timing controller TC generates various signals based on the image data and synchronization signals input from outside. For example, the timing controller TC outputs a video signal generated by a predetermined signal process to the source driver SD based on image data. The timing controller TC outputs a control signal generated based on a synchronization signal to the gate drivers GD1 and GD2, the source driver SD, the Vcom circuit VC and the light source driver LSD. The detail of the timing controller TC is explained later.

The display area DA indicated by the alternate long and short dash line in FIG. 3 comprises a plurality of pixels PX. Each pixel PX comprises a switching element SW and a pixel electrode 11. Each switching element SW is electrically connected to a corresponding scanning line G and a corresponding signal line S. The pixel electrodes 11 are located in the display area DA, and are arrayed in matrix. The pixels PX or pixel electrodes 11 arranged in line in the first direction X constitute a pixel line PXL. For example, all the pixel electrodes 11 constituting a pixel line PXL are electrically connected to the same scanning line G. Each pixel electrode 11 is electrically connected to a corresponding signal line S via a corresponding switching element SW. The common electrode 21 is located in the display area DA. The common electrode 21 faces a plurality of pixel electrodes 11. It should be noted that the common electrode 21 may be sectioned such that each section is based on at least one pixel PX. The sections may be electrically connected to a common line such that common voltage is applied. A scanning signal is supplied to each scanning line G from the gate driver GD1 or GD2. A video signal is supplied to each signal line S from the source driver SD. Common voltage is applied to the common electrode 21 from the Vcom circuit VC. When a switching element SW is in a conduction state based on the scanning signal supplied to the scanning line G, the video signal supplied to the signal line S is supplied to the pixel electrode 11 electrically connected to the switching element SW. In the following explanation, the generation of a potential difference between a pixel electrode 11 and the common electrode 21 by supplying a video signal to the pixel electrode 11 may be described as to write a video signal (or to apply voltage) to the pixel PX comprising the pixel electrode 11.

The light source unit LU comprises at least one light-emitting element LS. For example, the light source unit LU comprises a light-emitting element (first light-emitting element) LSR which emits light in a first color, a light-emitting element (second light-emitting element) LSG which emits light in a second color, and a light-emitting element (third light-emitting element) LSB which emits light in a third color. For example, the first color is red. The second color is green. The third color is blue.

The light source driver LSD controls the lighting period of the light-emitting elements LSR, LSG and LSB in accordance with the luminance setting information from outside, a video signal from a data converter, a control signal from the timing controller, etc. As described in detail later, in a drive scheme in which each frame period comprises a plurality of sub-frame (field) periods, at least one of the three light-emitting elements LSR, LSG and LSB lights up in each sub-frame, and the color of the illumination light is switched based on each sub-frame.

Now, this specification explains a structural example of the display device comprising the liquid crystal layer 30 which is a polymer dispersed liquid crystal layer.

FIG. 4A schematically shows the liquid crystal layer 30 in a transparent state.

The liquid crystal layer 30 includes a liquid crystal polymer 31 and liquid crystal molecules 32. The liquid crystal polymer 31 is obtained when, for example, liquid crystal monomers are polymerized in a state where the liquid crystal monomers are aligned in a predetermined direction by the alignment restriction force of the alignment films 12 and 22. The liquid crystal molecules 32 are dispersed in liquid crystal monomers. When the liquid crystal monomers are polymerized, the liquid crystal molecules 32 are aligned in a predetermined direction based on the alignment direction of the liquid crystal monomers. The alignment films 12 and 22 may be horizontal alignment films for aligning the liquid crystal monomers and the liquid crystal molecules 32 along the X-Y plane defined by the first direction X and the second direction Y, or may be vertical alignment films for aligning the liquid crystal monomers and the liquid crystal molecules 32 in the third direction Z.

The liquid crystal molecules 32 may be positive liquid crystal molecules having positive dielectric anisotropy, or may be negative liquid crystal molecules having negative dielectric anisotropy. The liquid crystal polymer 31 and the liquid crystal molecules 32 have the same optical anisotropy. Alternatively, the liquid crystal polymer 31 and the liquid crystal molecules 32 have substantially the same refractive anisotropy. Thus, the liquid crystal polymer 31 and the liquid crystal molecules 32 have substantially the same ordinary index and substantially the same extraordinary index. It should be noted that the ordinary index or extraordinary index of the liquid crystal polymer 31 may not be completely the same as that of the liquid crystal molecules 32. A difference made by a manufacturing error, etc., is allowed. The response property for an electric field differs between the liquid crystal polymer 31 and the liquid crystal molecules 32. The response property of the liquid crystal polymer 31 for an electric field is lower than the response property of the liquid crystal molecules 32 for an electric field.

The example shown in FIG. 4A is equivalent to, for example, a state in which voltage is not applied to the liquid crystal layer 30 (a state in which the potential difference between the pixel electrode 11 and the common electrode 21 is zero), or a state in which the transparent voltage described later is applied to the liquid crystal layer 30.

As shown in FIG. 4A, optical axis Ax1 of the liquid crystal polymer 31 is parallel to optical axis Ax2 of each liquid crystal molecule 32. In the example shown in FIG. 4A, both optical axis Ax1 and optical axis Ax2 are parallel to the third direction Z. Here, each optical axis is equivalent to a line parallel to the direction of travel of a light beam in which the refractive index takes a single value regardless of the direction of polarization.

As described above, the liquid crystal polymer 31 and the liquid crystal molecules 32 have substantially the same refractive anisotropy. Further, optical axis Ax1 is parallel to optical axis Ax2. Thus, in all directions including the first direction X, the second direction Y and the third direction Z, there is little difference in the refractive index between the liquid crystal polymer 31 and the liquid crystal molecules 32. Thus, light L1 entering the liquid crystal layer 30 in the third direction Z passes through the liquid crystal layer 30 with little scattering. The liquid crystal layer 30 is capable of maintaining the parallelism of light L1. Similarly, both light L2 and light L3 entering the liquid crystal layer 30 in a direction inclined with respect to the third direction Z are scattered very little in the liquid crystal layer 30. In this way, a high transparency can be obtained. The state shown in FIG. 4A is called a transparent state.

FIG. 4B schematically shows the liquid crystal layer 30 in a scattering state.

As described above, the response property of the liquid crystal polymer 31 for an electric field is lower than the response property of the liquid crystal molecules 32 for an electric field. Thus, in a state where voltage (the scattering voltage described later) higher than the transparent voltage described above is applied to the liquid crystal layer 30, the alignment direction of the liquid crystal polymer 31 hardly changes. However, the alignment direction of the liquid crystal molecules 32 is changed based on the electric field. As shown in FIG. 4B, optical axis Ax1 is substantially parallel to the third direction Z. However, optical axis Ax2 is inclined with respect to the third direction Z. Thus, optical axis Ax1 intersects optical axis Ax2. In all directions including the first direction X, the second direction Y and the third direction Z, the refractive index differs largely between the liquid crystal polymer 31 and the liquid crystal molecules 32. In this way, light L1 to light L3 entering the liquid crystal layer 30 are scattered in the liquid crystal layer 30. The state shown in FIG. 4B is called a scattering state.

FIG. 5A is a cross-sectional view showing the display panel PNL when the liquid crystal layer 30 is in a transparent state.

Illumination light L11 emitted from the light-emitting element LS enters the display panel PNL through the edge portion E5, and is propagated through the transparent substrate 20, the liquid crystal layer 30, the transparent substrate 10, etc. When the liquid crystal layer 30 is in a transparent state, illumination light L11 is hardly scattered in the liquid crystal layer 30. Thus, illumination light L11 hardly leaks out of a lower surface 10B of the transparent substrate 10 and an upper surface 20T of the transparent substrate 20.

External light L12 entering the display panel PNL passes through the liquid crystal layer 30 with little scattering. The external light entering the display panel PNL through the lower surface 10B is emitted from the upper surface 20T. The external light entering the display panel PNL through the upper surface 20T is emitted from the lower surface 10B. Thus, when the user observes the display panel PNL from the upper surface 20T side, the user can view the background on the lower surface 10B side through the display panel PNL. Similarly, when the user observes the display panel PNL from the lower surface 10B side, the user can view the background on the upper surface 20T side through the display panel PNL.

Figure 5B:
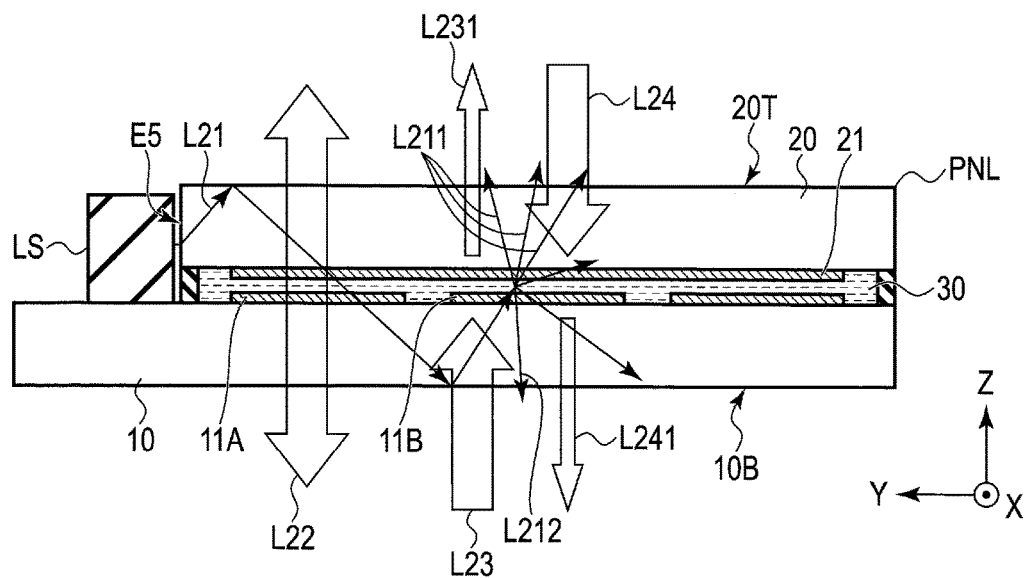
FIG. 5B is a cross-sectional view showing the display panel when the liquid crystal layer is in a scattering state.

FIG. 5B is a cross-sectional view showing the display panel PNL when the liquid crystal layer 30 is in a scattering state.

Illumination light L21 emitted from the light-emitting element LS enters the display panel PNL through the edge portion E5, and is propagated through the transparent substrate 20, the liquid crystal layer 30, the transparent substrate 10, etc. In the example shown in FIG. 5B, as the liquid crystal layer 30 between a pixel electrode 11A and the common electrode 21 is in a transparent state, illumination light L21 is hardly scattered in, of the liquid crystal layer 30, the area overlapping the pixel electrode 11A. As the liquid crystal layer 30 between a pixel electrode 11B and the common electrode 21 is in a scattering state, illumination light L21 is scattered in, of the liquid crystal layer 30, the area overlapping the pixel electrode 11B. Of illumination light L21, partial scattered light L211 is emitted from the upper surface 20T, and partial scattered light L212 is emitted from the lower surface 10B.

In the area overlapping the pixel electrode 11A, external light L22 entering the display panel PNL passes through the liquid crystal layer 30 with little scattering in a manner similar to external light L12 shown in FIG. 5A. In the area overlapping the pixel electrode 11B, external light L23 entering the display panel PNL through the lower surface 10B is partially scattered in the liquid crystal layer 30. As a result, partial external light L231 is emitted from the upper surface 20T. External light L24 entering the display panel PNL through the upper surface 20T is partially scattered in the liquid crystal layer 30. As a result, partial external light L241 is emitted from the lower surface 10B.

Thus, when the user observes the display panel PNL from the upper surface 20T side, the user can view the color of illumination light L21 in the area overlapping the pixel electrode 11B. Since partial external light L231 passes through the display panel PNL, the user can also view the background on the lower surface 10B side through the display panel PNL. Similarly, when the user observes the display panel PNL from the lower surface 10B side, the user can view the color of illumination light L21 in the area overlapping the pixel electrode 11B. Since partial external light L241 passes through the display panel PNL, the user can also view the background on the upper surface 20T side through the display panel PNL. In the area overlapping the pixel electrode 11A, the liquid crystal layer 30 is in a transparent state. Thus, the color of illumination light L21 is hardly viewed. The user can view the background through the display panel PNL.

Figure 6:
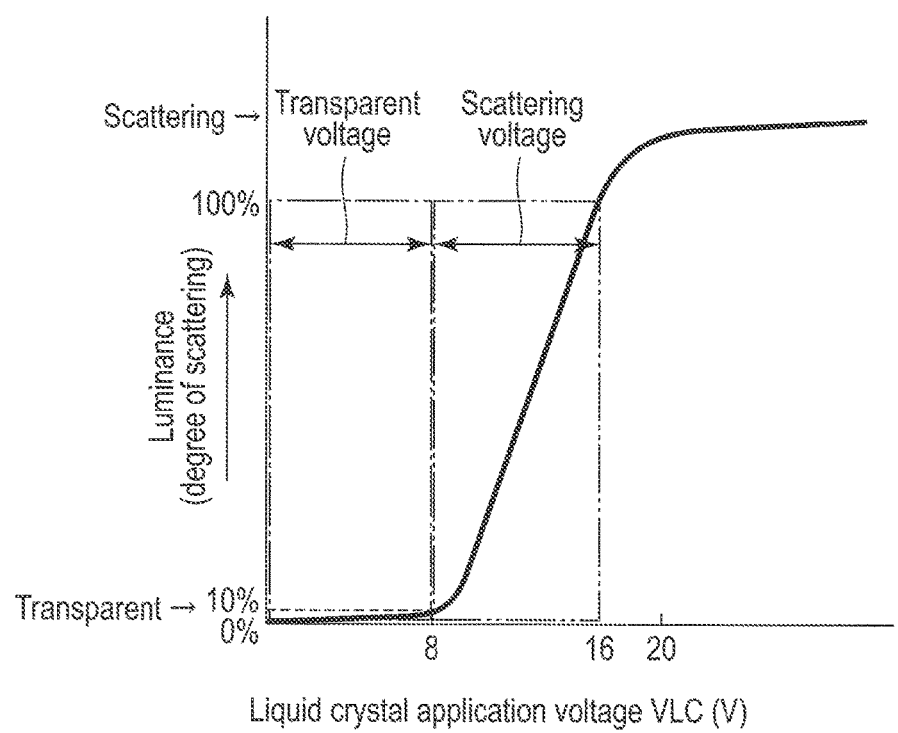
FIG. 6 is a graph showing the scattering property of the liquid crystal layer.

FIG. 6 is a graph showing the scattering property of the liquid crystal layer 30, and shows the relationship between liquid crystal application voltage VLC applied to the liquid crystal layer 30 and the luminance. Liquid crystal application voltage VLC corresponds to a potential difference between the pixel electrode 11 and the common electrode 21. Here, as shown in, for example, FIG. 5B, the luminance is equivalent to the luminance of scattered light L211 obtained when illumination light L21 emitted from the light-emitting element LS is scattered in the liquid crystal layer 30. In another respect, the luminance indicates the degree of scattering of the liquid crystal layer 30.

While liquid crystal application voltage VLC is increased from 0V, the luminance steeply rises in an area where liquid crystal application voltage VLC exceeds approximately 8V. When liquid crystal application voltage VLC reaches approximately 20V, the luminance is saturated. When liquid crystal application voltage VLC is between 0V and 8V, the luminance is slightly increased. In the present embodiment, the voltage in the range surrounded by the alternate long and two short dashes line, in other words, the range between 8V and 16V, is used for the gradation reproduction of each pixel (for example, 256 levels). Hereinafter, the liquid crystal application voltage of $8V<VLC\leq 16V$ is referred to as scattering voltage. In the present embodiment, the liquid crystal application voltage in the range surrounded by the alternate long and short dash line, in other words, the liquid crystal application voltage of $0V\leq VLC\leq 8V$, is referred to as transparent voltage. Here, transparent voltage includes first transparent voltage and second transparent voltage. The lower and upper limits of scattering voltage and the lower and upper limits of transparent voltage is not limited to the example explained here. They may be arbitrarily determined based on the scattering property of the liquid crystal layer 30.

For example, it is assumed that the luminance is 100% when scattering voltage is 16V as the upper limit. In this case, the range of transparent voltage may be defined as the range of liquid crystal application voltage VLC in which the luminance is less than 10%. Alternatively, transparent voltage may be defined as liquid crystal application voltage VLC less than or equal to voltage (8V in the example of FIG. 6) corresponding to the minimum gradation. For example, the first transparent voltage is equivalent to 8V of liquid crystal application voltage VLC, and the second transparent voltage is equivalent to 0V of liquid crystal application voltage VCL. Alternatively, the first transparent voltage is equivalent to liquid crystal application voltage VLC less than or equal to 8V, and the second transparent voltage is equivalent to liquid crystal application voltage less than the first transparent voltage. Alternatively, when the maximum scattering luminance is 100%, the second transparent voltage is equivalent to liquid crystal application voltage in which the luminance is less than 10%, and the first transparent voltage is equivalent to liquid crystal application voltage in which the luminance is less than or equal to 50%. The state in which transparent voltage is applied to the liquid crystal layer 30 is equivalent to a state in which the liquid crystal layer 30 hardly exhibits a scattering property and has transparency to the extent that the background can be viewed through the display panel PNL.

For example, of transparent voltage, the transparency of the liquid crystal layer 30 when the second transparent voltage is applied is higher than that when the first transparent voltage is applied. The transparency of the liquid crystal layer 30 when transparent voltage is applied is higher than that when scattering voltage is applied. The degree of scattering of the light passing through the liquid crystal layer 30 when scattering voltage is applied is higher than that when transparent voltage is applied. The degree of scattering of the light passing through the liquid crystal layer 30 when the first transparent voltage is applied is higher than that when the second transparent voltage is applied. With regard to the parallelism of the light passing through the liquid crystal layer 30, the parallelism of the liquid crystal layer 30 when transparent voltage is applied is higher than that when scattering voltage is applied. The parallelism of the liquid crystal layer 30 when the second transparent voltage is applied is higher than that when the first transparent voltage is applied.

When voltage is applied to the liquid crystal layer 30, the polarity of liquid crystal application voltage VLC may be either positive (+) or negative (−). The graph shown in FIG. 6 is equivalent to the absolute value of liquid crystal application voltage VLC.

Figure 7A:
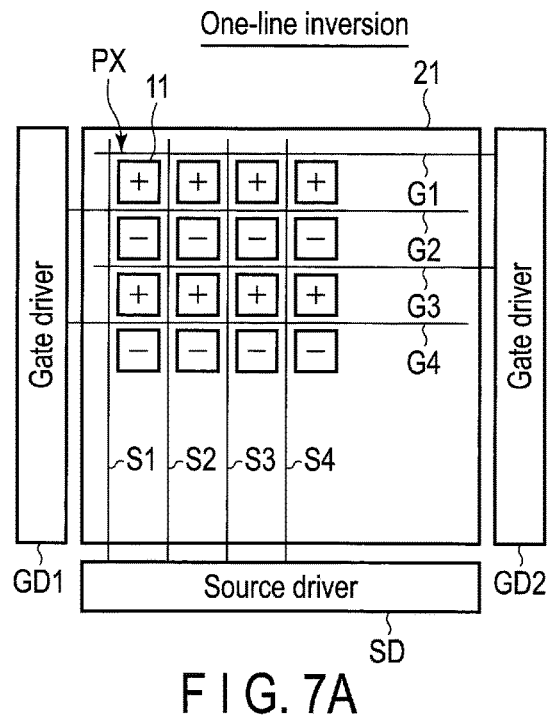
FIG. 7A shows the outline of a one-line inversion drive scheme.
Figure 7B:
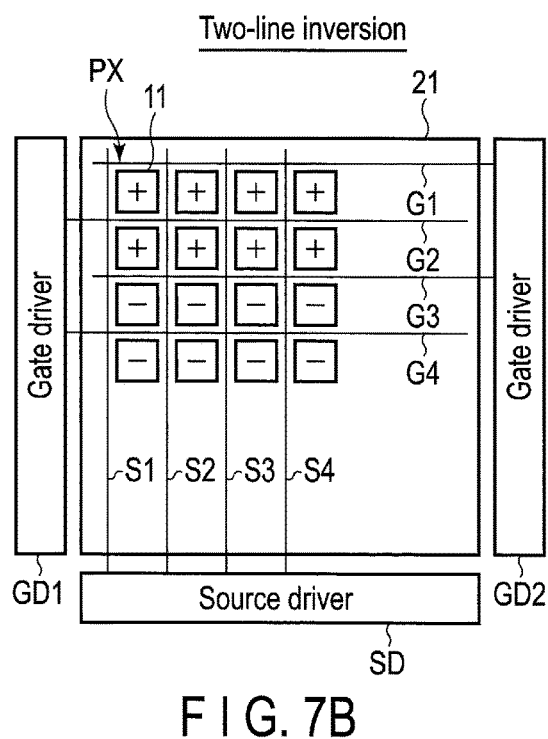
FIG. 7B shows the outline of a two-line inversion drive scheme.
Figure 7C:
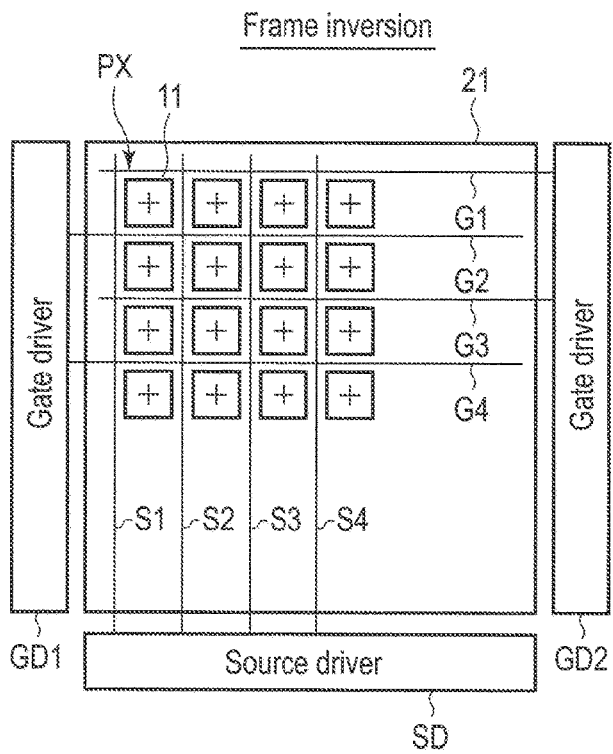
FIG. 7C shows the outline of a frame-inversion drive scheme.

Polarity inversion for inverting the polarity of liquid crystal application voltage may be applied to the display device DSP. FIG. 7A, FIG. 7B and FIG. 7C show the outline of polarity inversion.

FIG. 7A shows a one-line-inversion drive scheme for inverting liquid crystal application voltage (in other words, the voltage written to the pixels PX) between positive polarity (+) and negative polarity (−) for the group of pixels PX electrically connected to each scanning line G (in other words, for each pixel line). In this drive method, for example, the polarity of the common voltage applied to the common electrode 21 and the polarity of the video signal supplied from the source driver SD to the signal lines S (in other words, the polarity of signal line voltage) are inverted for each horizontal period in which the gate drivers GD1 and GD2 supply a scanning signal to the scanning lines G. In the same horizontal period, the polarity of common voltage is, for example, opposite to that of a video signal.

FIG. 7B shows a two-line-inversion drive scheme for inverting liquid crystal application voltage between positive polarity (+) and negative polarity (−) for every two consecutive lines. The present embodiment is not limited to the examples of FIG. 7A and FIG. 7B. The polarity may be inverted for every three or more pixel lines.

FIG. 7C shows a frame-inversion drive scheme for inverting liquid crystal application voltage between positive polarity (+) and negative polarity (−) for each frame period in which an image is displayed based on image data. In this drive method, for example, the polarity of common voltage and the polarity of a video signal are inverted for each frame period. In the same frame period, the polarity of common voltage is, for example, opposite to that of a video signal.

Figure 8:
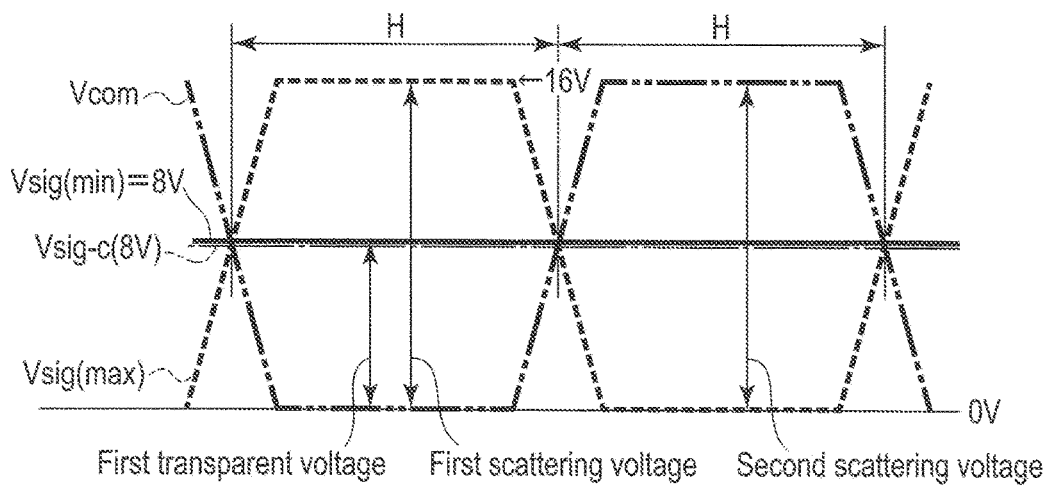
FIG. 8 shows an example of common voltage and signal line voltage in display scanning.

FIG. 8 shows an example of common voltage Vcom applied to the common electrode 21 and signal line voltage Vsig applied to the signal lines S (or the pixel electrodes 11) in display scanning to which the one-line-inversion drive scheme shown in FIG. 7A is applied.

With respect to signal line voltage Vsig, FIG. 8 shows a waveform corresponding to the maximum value (max) of gradation and a waveform corresponding to the minimum value (min) of gradation. Here, the waveform of signal line voltage Vsig (min) is indicated by a solid line. The waveform of reference voltage Vsig-c is indicated by an alternate long and short dash line. The waveform of common voltage Vcom is indicated by an alternate long and two short dashes line. The waveform of signal line voltage Vsig (max) is indicated by a broken line. In the example of FIG. 8, the polarity of common voltage Vcom and the polarity of signal line voltage Vsig (see the waveform of the maximum value) are inverted for each horizontal period H based on reference voltage Vsig-c as the center. Reference voltage Vsig-c is, for example, 8V. In each of common voltage Vcom and signal line voltage Vsig, the lower limit is 0V, and the upper limit is 16V.

When liquid crystal application voltage is positive, the difference between signal line voltage Vsig and common voltage Vcom (Vsig−Vcom) is 0V or positive voltage. In this case, signal line voltage Vsig is greater than or equal to reference voltage Vsig-c. When liquid crystal application voltage is negative, the difference between signal line voltage Vsig and common voltage Vcom (Vsig−Vcom) is 0V or negative voltage. In this case, signal line voltage Vsig is less than or equal to reference voltage Vsig-c.

In a period for writing positive liquid crystal application voltage to the pixels PX, common voltage Vcom is 0V, and signal line voltage Vsig is voltage based on the gradation indicated by image data in the range greater than or equal to 8V and less than or equal to 16V. In a period for writing negative voltage to the pixels PX, common voltage Vcom is 16V, and signal line voltage Vsig is voltage based on the gradation indicated by image data in the range greater than or equal to 0V and less than or equal to 8V. In either case, voltage greater than or equal to 8V and less than or equal to 16V is applied between the common electrode 21 and the pixel electrodes 11.

In the example shown in FIG. 8, when signal line voltage Vsig (min) is 8V, and common voltage Vcom is 0V or 16V, liquid crystal application voltage is 8V, and is equivalent to the first transparent voltage. Liquid crystal application voltage exceeding 8V is equivalent to scattering voltage. Scattering voltage has positive first scattering voltage and negative second scattering voltage as shown in FIG. 8. In the positive first scattering voltage, the difference between signal line voltage Vsig and common voltage Vcom (Vsig−Vcom) is greater than +8V and less than or equal to +16V. In the negative second scattering voltage, the difference between signal line voltage Vsig and common voltage Vcom (Vsig−Vcom) is less than −8V and greater than or equal to −16V.

As shown in FIG. 6, even when liquid crystal application voltage VLC is 8V, the degree of scattering of the liquid crystal layer 30 is approximately 0% to 10%. Even when signal line voltage Vsig is the minimum value of gradation, the light entering the display panel PNL is slightly scattered.

In the present embodiment, the visibility of the background of the display panel PNL can be improved by incorporating transparent scanning in which the voltage between the pixel electrodes 11 and the common electrode 21 is less than, for example, the lower limit of gradation (in other words, the scanning in a first period T1 as described later) into the sequence of image display.

Figure 9:
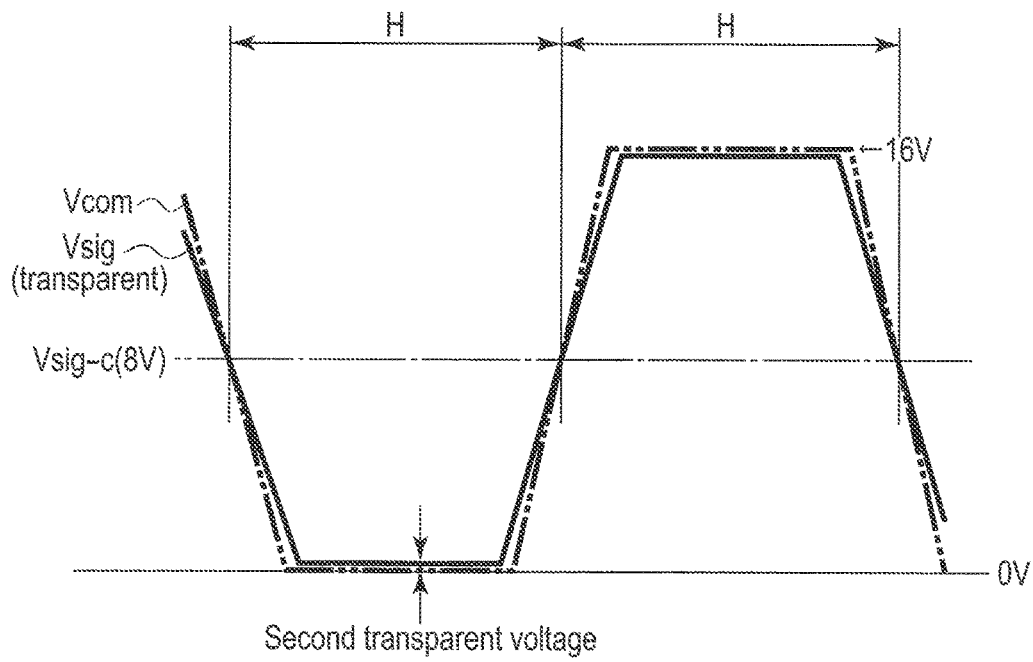
FIG. 9 shows an example of common voltage and signal line voltage in transparent scanning.

FIG. 9 shows an example of common voltage Vcom and signal line voltage Vsig in transparent scanning. Here, the waveform of signal line voltage Vsig is indicated by a solid line. The waveform of common voltage Vcom is indicated by an alternate long and two short dashes line.

In a manner similar to that of FIG. 8, common voltage Vcom is alternately switched to 0V and 16V for each horizontal period H. Thus, the polarity of common voltage Vcom is inverted with respect to reference voltage Vsig-c for each horizontal period H. In transparent scanning, the polarity of signal line voltage Vsig is the same as the polarity of common voltage Vcom. In this way, the potential difference between signal line voltage Vsig and common voltage Vcom is less than 8V, thereby increasing the transparency of the liquid crystal layer 30. In the example of FIG. 9, signal line voltage Vsig substantially coincides with common voltage Vcom in each horizontal period H (Vsig=Vcom=0V or Vsig=Vcom=16V). Thus, liquid crystal application voltage is substantially 0V, and this liquid crystal application voltage is equivalent to the second transparent voltage. In FIG. 9, signal line voltage Vsig and common voltage Vcom are shown such that they are slightly different from each other for the sake of convenience.

In transparent scanning, liquid crystal application voltage should be less than the lower limit (for example, 8V) of gradation. Signal line voltage Vsig may not completely coincide with common voltage Vcom. In a period in which common voltage Vcom is substantially 0V, signal line voltage Vsig in transparent scanning can be determined in the range of 0V≤Vsig<8V. In a period in which common voltage Vcom is 16V, signal line voltage Vsig in transparent scanning can be determined in the range of 8V<Vsig≤16V. In either period, in transparent scanning, the potential difference between signal line voltage Vsig and common voltage Vcom is less than 8V, thereby obtaining the above transparent state. In other words, the second transparent voltage is not limited to a case where liquid crystal application voltage is substantially 0V. Liquid crystal application voltage may be less than 8V.

Figure 10:
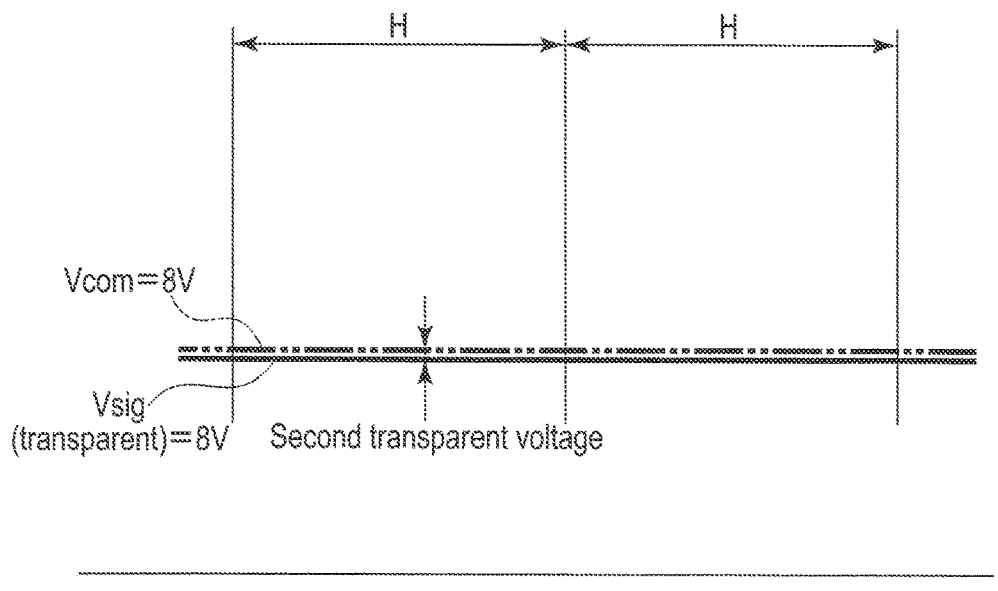
FIG. 10 shows another example of common voltage and signal line voltage in transparent scanning.

FIG. 10 shows another example of common voltage Vcom and signal line voltage Vsig in transparent scanning. Here, the waveform of signal line voltage Vsig is indicated by a solid line. The waveform of common voltage Vcom is indicated by an alternate long and two short dashes line.

In the example of FIG. 10, in transparent scanning, the polarity inversion of common voltage Vcom and signal line voltage Vsig is stopped. Further, common voltage Vcom coincides with signal line voltage Vsig at 8V (that is, the above reference voltage Vsig-c). Thus, liquid crystal application voltage is substantially 0V, and this liquid crystal application voltage is equivalent to the second transparent voltage. Common voltage Vcom may coincide with signal line voltage Vsig at voltage other than reference voltage Vsig-c, for example, at substantially 0V. Common voltage Vcom may be different from signal line voltage Vsig in, for example, a range in which the potential difference between them is greater than 0V and less than 8V.

In the above description, transparent scanning is explained with the example of a one-line-inversion drive scheme. However, the same transparent scanning can be applied to two-line and more-line-inversion drive schemes and a frame-inversion drive scheme.

Now, this specification explains a control example of the display device DSP into which transparent scanning is incorporated, referring to FIG. 11 to FIG. 14. Here, a drive system in which each frame period comprises a plurality of sub-frame (field) periods is applied to the display device DSP. This drive system is called, for example, a field sequential system. In each sub-frame period, a red, green or blue image is displayed. The images of the respective colors displayed by time division are viewed by the user as an image of multicolor display.

Figure 11:
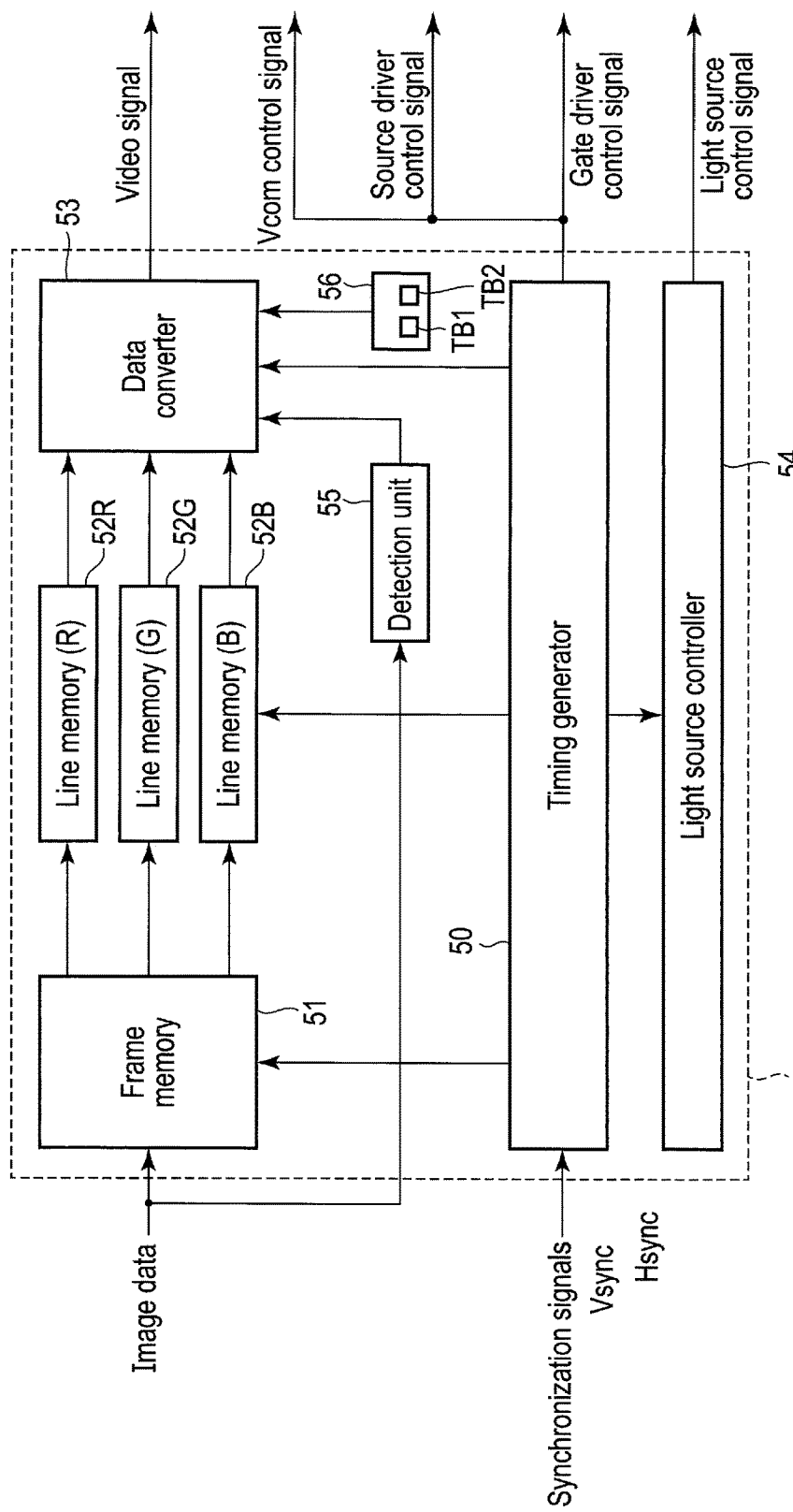
FIG. 11 shows a configuration example of the timing controller shown in FIG. 3.

FIG. 11 shows a configuration example of the timing controller TC shown in FIG. 3.

The timing controller TC comprises a timing generator 50, a frame memory 51, line memories 52R, 52G and 52B, a data converter 53, a light source controller 54, a detection unit 55, a memory 56, etc.

The frame memory 51 stores image data for one frame input from outside. The line memories 52R, 52G and 52B store red, green and blue sub-frame data, respectively. The sub-frame data indicates the red, green or blue image (for example, the gradation value of each pixel) to be displayed in the pixels PX by time division. The sub-frame data of each color stored in the line memories 52R, 52G and 52B corresponds to the data of the frame which is one frame before the image data stored in the frame memory 51. When the frame memory 51 is configured to separately output the red, green and blue sub-frame data, the line memories may be omitted. The data converter 53 generates a video signal by applying various data conversion processes such as gamma correction to the sub-frame data of each color stored in the line memories 52R, 52G and 52B, and outputs the generated video signal to the above source driver SD. At the time of transparent scanning, the data converter 53 performs a data conversion process such that the potential difference between common voltage Vcom and signal line voltage Vsig is in the above range of transparent voltage.

The light source controller 54 outputs a light source control signal to the above light source driver LSD. The light source driver LSD drives the light-emitting elements LSR, LSG and LSB based on the light source control signal. The light-emitting elements LSR, LSG and LSB may be driven by, for example, pulse width modulation (PWM) control. The light source driver LSD is capable of adjusting the luminance of the light-emitting elements LSR, LSG and LSB by the duty ratio of the signals output to the light-emitting elements LSR, LSG and LSB.

The timing generator 50 controls the operation timing of the frame memory 51, the line memories 52R, 52G and 52B, the data converter 53 and the light source controller 54 in synchronization with a vertical synchronization signal Vsync and a horizontal synchronization signal Hsync input from outside. The timing generator 50 controls the Vcom circuit VC by a Vcom control signal, controls the source driver SD by a source driver control signal, and controls the gate drivers GD1 and GD2 by a gate driver control signal.

The detection unit 55 is configured to determine whether the data of a character is included in the image data for one frame input from outside. When the data of a character is included, the detection unit 55 is configured to detect the address of the data of the character. Here, a character refers to, for example, the letter, figure or icon to be displayed in a part of the display surface. The address information of the data of the character is provided to the data converter 53. Thus, when the data of a character is included in the image data input from outside, the timing controller TC is capable of generating a processed video signal and outputting it to the source driver SD to adjust the display color of a character display area for displaying the character and the background color of the peripheral area of the character display area (in other words, several pixel lines above and under the character display area). A processed video signal may be generated by the operation of the data converter 53 or by using a table stored in the memory 56 of the timing controller TC.

The memory 56 stores a first table TB1 indicating a combination of a first display color indicating the display color of the character display area described later and a second display color indicating the background color of the peripheral area of the character display area, and a second table TB2 indicating a combination of a first number of pixel lines indicating the size of the character to be displayed, and a second number of pixel lines and a third number of pixel lines indicating the margins located on the upper and lower areas than the character.

Now, this specification explains an example for adjusting the degree of scattering (transparency) of characters and the peripheral area of the characters.

Figure 12:
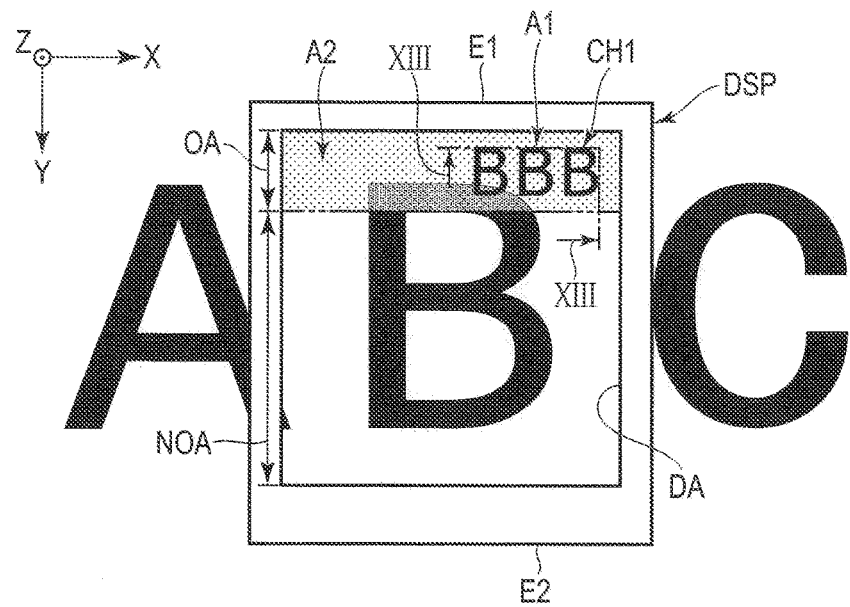
FIG. 12 is a plan view of the display device DSP in a state where characters are displayed in an object area.

As shown in FIG. 12, it is assumed that the user views the character "B" of the character string "ABC" described in the background of the display device DSP through the display device DSP. When the characters CH1 of the character string "BBB" are simply displayed in the display area DA, the characters CH1 may overlap the character "B" of the background. Thus, the user may not be able to easily view (identify) the characters CH1. The present embodiment provides a technology for allowing the user to easily view the characters CH1 even when the characters CH1 overlap the character "B" of the background. Alternatively, the present embodiment provides a technology for preventing the effect of the background on the user.

In the display area DA, the area for displaying the characters CH1 is defined as a first area A1. In the example shown in FIG. 12, three characters CH1 are arranged at intervals. Thus, the first area A1 is a discontinuous area. In the display area DA, the area at least including the entire area of the pixel lines in which the first area A1 is located is defined as an object area OA. In the present embodiment, the object area OA includes the entire area of the pixel lines in which the first area A1 is located, the entire area (in other words, the upper margin) of some pixel lines on the edge portion E1 side in comparison with the first area A1, and the entire area (in other words, the lower margin) of some pixel lines on the edge portion E2 side in comparison with the first area A1. In this example, the object area OA is set at the edge of the display area DA on the edge portion E1 side. In the object area OA, the area other than the first area A1 is defined as a second area A2. In the display area DA, the area other than the object area OA is defined as a non-object area (third area) NOA.

Figure 13:
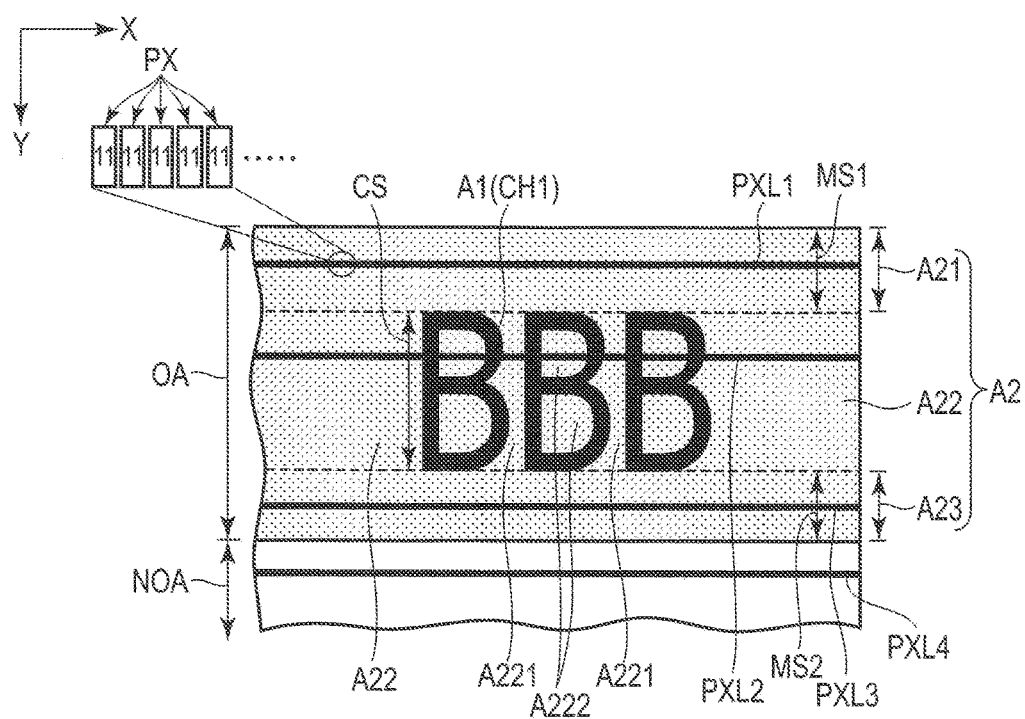
FIG. 13 is shown for explaining the object area OA shown in FIG. 12.

This specification explains the object area OA in more detail with reference to FIG. 13.

The object area OA comprises the first area A1 equivalent to the characters CH1, and the second area A2 equivalent to the peripheral area around the first region A1. The second area A2 is equivalent to the entire area indicated with dots in the figure, and comprises a first portion A21, a second portion A22 adjacent to the first portion A21, and a third portion A23 adjacent to the second portion A22. The first portion A21, the second portion A22 and the third portion A23 are arranged in this order in the second direction Y. The first area A1 and the second portion A22 are arranged in the first direction X. The first portion A21 is equivalent to a strip-shaped area located in the upper area than the first area A1 or on the display area edge portion E1 side of the first area A1 and extending in the first direction X. The third portion A23 is equivalent to a strip-shaped area located in the lower area than the first area A1 or on the display area edge portion E2 side of the first area A1 and extending in the first direction X. The second portion A22 is equivalent to the area other than the first area A1 between the first portion A21 and the third portion A23. The second portion A22 also includes areas A221 between the characters "B" and "B" arranged in the first direction X, areas A222 surrounded by each character "B", etc.

A plurality of pixel lines constitute the object area OA and the non-object area NOA. More specifically, one or more pixel lines including a pixel line PXL1 constitute the first portion A21. One or more pixel lines including a pixel line (first pixel line) PXL2 constitute the first area A1 and the second portion A22. Thus, the first area A1 and at least a part of the second portion A22 are located in the same pixel line. One or more pixel lines including a pixel line PXL3 constitute the third portion A23. A plurality of pixel lines including a pixel line (second pixel line) PXL4 constitute the non-object area NOA. As shown in FIG. 13, a plurality of pixel electrodes 11 or a plurality of pixels PX arranged in the first direction X constitute the pixel line PXL1. Other pixel lines PXL2 to PXL4 are structured in the same manner as the pixel line PXL1.

The first display color of the first area A1 is determined based on the color information of the characters CH1 included in the image data input from outside. The second display color of the second area A2 is determined in accordance with the determined first display color based on the first table TB1 described later.

The number of pixel lines constituting the first area A1 and the second portion A22 is determined based on the size information of the characters CH1 included in image data. The size CS of the characters CH1 is equivalent to the length of the characters CH1 in the second direction Y and is equivalent to the width of m pixel lines arranged in the second direction Y. The number of pixel lines constituting each of the first portion A21 and the third portion A23 is determined in accordance with the size of the upper or lower margin required corresponding to the size of the characters CH1 based on the second table TB2 described later. The size MS1 of the upper margin is equivalent to the width of n1 pixel lines arranged in the second direction Y. The size MS2 of the lower margin is equivalent to the width of n2 pixel lines arranged in the second direction Y. Each of m, n1 and n2 is positive integer.

Figures 14, 15A:
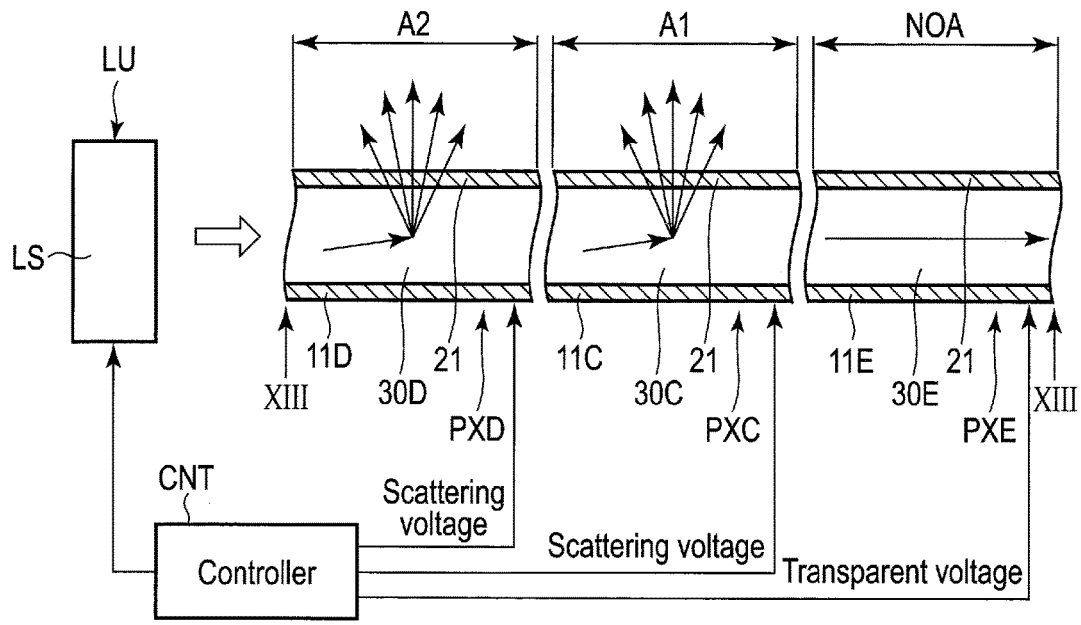
FIG. 14 is a cross-sectional view of the display panel along the line XIII-XIII of FIG. 12.
FIG. 15A shows an example of a first table TB1.

FIG. 14 only shows, of the display panel PNL, a portion necessary for explanation. FIG. 14 shows an example of optical paths.

The pixel electrodes 11 include a first pixel electrode 11C located in the first area A1, a second pixel electrode 11D located in the second area A2, and a third pixel electrode 11E located in the non-object area NOA. For example, the first pixel electrode 11C and the second pixel electrode 11D are included in the same pixel line (the pixel line PXL2 shown in FIG. 13), and are electrically connected to the same scanning line G of a plurality of scanning lines G. The third pixel electrode 11E is included in a pixel line (the pixel line PXL4 shown in FIG. 13) different from that of the first pixel electrode 11C and the second pixel electrode 11D, and is electrically connected to another scanning line G of the scanning lines G.

The liquid crystal layer (display function layer) 30 includes a first liquid layer (first display function layer) 30C to which voltage between the first pixel electrode 11C and the common electrode 21 is applied, a second liquid crystal layer (second display function layer) 30D to which voltage between the second pixel electrode 11D and the common electrode 21 is applied, and a third liquid crystal layer (third display function layer) 30E to which voltage between the third pixel electrode 11E and the common electrode 21 is applied.

The pixels PX include a first pixel PXC, a second pixel PXD and a third pixel PXE. The first pixel PXC includes the first pixel electrode 11C, the first liquid crystal layer 30C, the common electrode 21, etc. The second pixel PXD includes the second pixel electrode 11D, the second liquid crystal layer 30D, the common electrode 21, etc. The third pixel PXE includes the third pixel electrode 11E, the third liquid crystal layer 30E, the common electrode 21, etc.

With regard to each frame period in which the characters CH1 are displayed, the controller CNT drives the light source unit LU so as to emit light from the light-emitting elements LS to the liquid crystal layer 30. The controller CNT applies scattering voltage to the first liquid crystal layer 30C and the second liquid crystal layer 30D and applies transparent voltage to the third liquid crystal layer 30E in the period for emitting light to the liquid crystal layer 30. The transparent voltage applied to the third liquid crystal layer 30E may be either the first transparent voltage or the second transparent voltage.

In this way, both the first liquid crystal layer 30C and the second liquid crystal layer 30D are in a scattering state. The third liquid crystal layer 30E is in a transparent state. Both the first liquid crystal layer 30C and the second liquid crystal layer 30E scatter the light emitted from the light source unit LU. The third liquid crystal layer 30E hardly scatters the light emitted from the light source unit LU. Each pixel constituting the pixel lines PXL1 and PXL3 shown in FIG. 13 is structured in the same manner as the second pixel PXD. In the same way as the second liquid crystal layer 30D, scattering voltage is applied to these pixels to scatter light.

Thus, the first area A1 scatters, of the light emitted from the light source unit LU, light in a partial color. Thus, the characters CH1 are displayed in the first display color C1. The second area A2 including the first portion A21, the second portion A22 and the third portion A23 scatters, of the light emitted from the light source unit LU, light in a partial color. Thus, the peripheral area of the characters CH1 is displayed in the second display color C2 different from the first display color C1. The first display color C1 and the second display color C2 can be realized by scattering, of the light emitted from the light source unit LU, light from a single light-emitting element or light from a plurality of light-emitting elements. It is possible to display all the characters CH1 in the same color or display the characters CH1 in different colors depending on each portion. For example, the first display color C1 and the second display color C2 are preferably colors other than achromatic colors.

Even when light is not emitted from the light source unit LU, external light is scattered in the area to which scattering voltage is applied as explained with reference to FIG. 5B, and external light is transmitted in the area to which voltage is not applied or the area to which transparent voltage is applied as explained with reference to FIG. 5A.

The degrees of scattering of the first and second liquid crystal layers 30C and 30D are higher than the degree of scattering of the third liquid crystal layer 30E. Thus, the visibility of the background of the display device DSP can be reduced in the first area A1 and the second area A2. When the user observes the display device DSP, the user cannot easily view the background of the characters CH1 equivalent to the first area A1 and the peripheral area equivalent to the second area A2. In this way, the user can easily view the characters CH1. Further, the first display color C1 of the first area A1 is different from the second display color C2 of the second area A2, thereby further improving the visibility of the characters. Since the third liquid crystal layer 30E is transparent, the visibility of the background of the display device DSP is excellent in the non-object area NOA.

FIG. 15A shows an example of the first table TB1.

The first display color C1 is different from the second display color C2. The first display color C1 and the second display color C2 are selected among colors which can be realized by the light-emitting elements LSR, LSG and LSB of the light source unit LU shown in FIG. 3. For example, the first display color C1 of the first area (characters) A1 may be selected among colors realized by lighting up at least one of the three light-emitting elements LSR, LSG and LSB. When the light-emitting elements LSR, LSG and LSB emit red light, green light and blue light, respectively, one of red, green, blue, cyan, magenta and yellow may be selected as the first display color C1. The second display color C2 of the second area (peripheral area) A2 should be at least different from the first display color C1. However, the second display color C2 is preferably a color which allows the characters of the first display color C1 to be easily viewed. For example, the second display color C2 is preferably a complementary color of the first display color C1. Since the display device to which PDLC is applied realizes color reproduction by color addition and color mixture, when a single color is selected for the second display color C2 from red, green and blue, the characters are more easily viewed. Here, as shown in FIG. 15A, the second display color C2 is blue or green. The combinations of the first display color C1 and the second display color C2 are not limited to the example shown in FIG. 15A.

Figures 15B, 16:
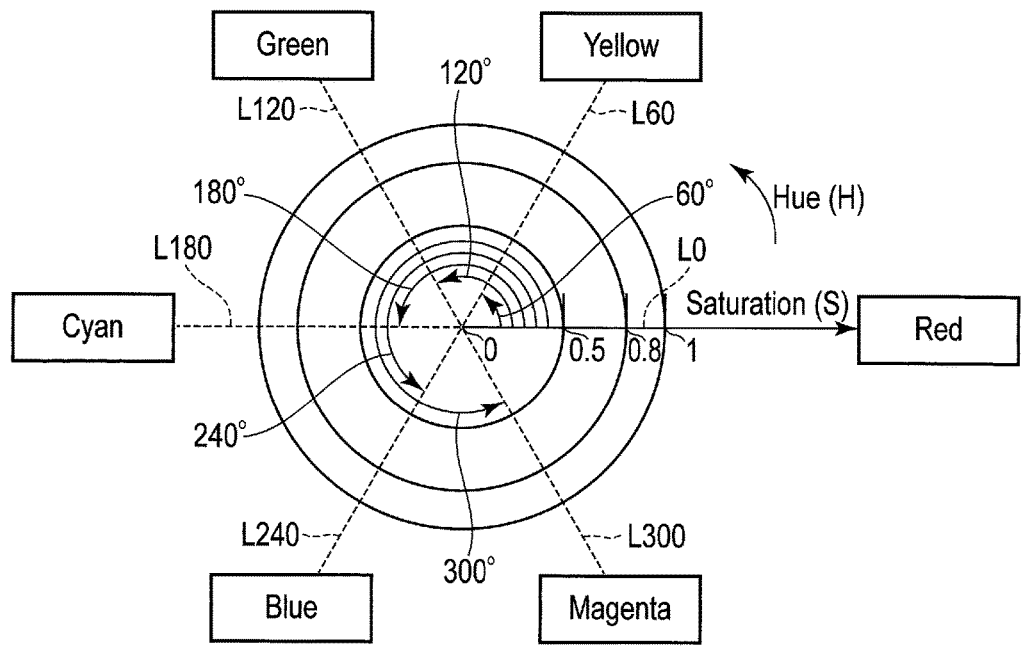
FIG. 15B is a conceptual diagram showing the relationship between hue (H) and saturation (S) in an HSV color space.
FIG. 16 shows an example of a second table TB2.

FIG. 15B is a conceptual diagram showing the relationship between hue (H) and saturation (S) in an HSV color space. The hue H is expressed from 0° to 360°. From 0° to 360°, the hue H is red, yellow, green, cyan, blue, magenta and red. In the example shown in FIG. 15B, the area including line L0 indicating an angle of 0° is red. The area including line L60 indicating an angle of 60° is yellow. The area including line L120 indicating an angle of 120° is green. The area including line L180 indicating an angle of 180° is cyan. The area including line L240 indicating an angle of 240° is blue. The area including line L300 indicating an angle of 300° is magenta. The above complementary color is equivalent to the relationship of two colors opposed to each other, or the relationship of two colors in which the difference in the angle is 180°±10°.

FIG. 16 shows an example of the second table TB2.

The first number (m) of pixel lines of the first area A1 corresponds to the size of the characters to be displayed. The second number (n1) of pixel lines of the first portion A21 of the second area A2 corresponds to the width of the margin located in the upper area than the first area A1 in the second direction Y. The third number (n2) of pixel lines of the third portion A23 of the second area A2 corresponds to the width of the margin located in the lower area than the first area A1 in the second direction Y. For example, m is an integer greater than n1 and n2, where n1 and n2 may be either the same integer or different integers. The number of pixel lines is the number of pixel lines arranged in the second direction Y as shown in FIG. 13, etc.

Figure 17:
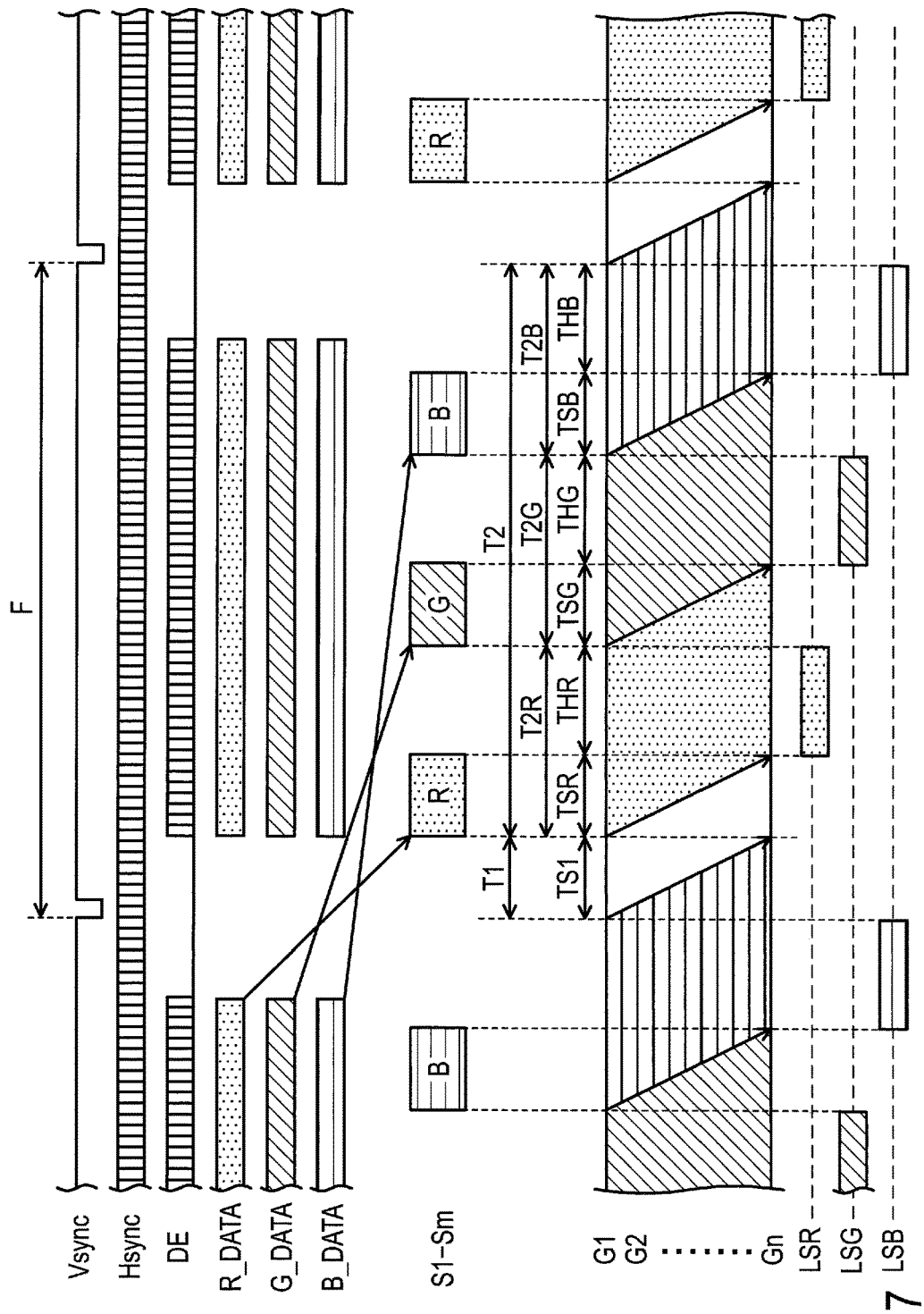
FIG. 17 is a timing chart showing an example of display operation.

FIG. 17 is a timing chart showing an example of display operation.

A vertical synchronization signal Vsync falls when a frame is started. In this example, the period which starts with the fall in a vertical synchronization signal Vsync and continues until the signal falls again is equivalent to a frame period F. For example, when the display device DSP is driven at 60 Hz, each frame period F is approximately 16.7 ms.

Each frame period F includes a first period T1 for performing the above transparent scanning, and a second period T2 for performing the above display scanning. In this example, the first period T1 is the head period of the frame period F, and the second period T2 follows the first period T1. The first period T1 may follow the second period T2.

In the first period T1, transparent scanning is performed under the control of the timing controller TC. The gate drivers GD1 and GD2 supply a scanning signal to the scanning lines G1 to Gn in series. While a scanning signal is supplied, the source driver SD applies, for example, signal line voltage Vsig substantially equal to common voltage Vcom to the signal lines S1 to Sm. By this operation, the second transparent voltage is written between the pixel electrodes 11 of all the pixels PX and the common electrode 21. The pixel electrode 11 of each pixel PX is electrically in a floating state until a next scanning signal is supplied to a corresponding scanning line G after a scanning signal is supplied to the scanning line G. Thus, the second transparent voltage is retained in each pixel PX to which the second transparent voltage is written until a next scanning signal is supplied to a corresponding scanning line G.

In each pixel PX to which the second transparent voltage is written, the liquid crystal layer 30 is in a good transparent state. Thus, the visibility of the background of the display panel PNL is increased. For example, all of the light-emitting elements LSR, LSG and LSB are turned off in the first period T1. However, in the first period T1, the second transparent voltage is written to all the pixels PX, and the liquid crystal layer 30 of all the pixels is in a transparent state. Thus, the light-emitting elements LSR, LSG and LSB may light up.

The signal line voltage Vsig applied to the signal lines S1 to Sm in the first period T1 is not necessarily equal to common voltage Vcom as long as the voltage written to each pixel PX is the second transparent voltage. The various forms explained with reference to FIG. 9 and FIG. 10 may be applied to common voltage Vcom and signal line voltage Vsig in transparent scanning. The transparent voltage written in the first period T1 may be the first transparent voltage.

The period in which a scanning signal is supplied to the scanning lines G1 to Gn in the first period T1 in series is equivalent to a scanning period TS1 in FIG. 17. In the example shown in FIG. 17, the second period T2 comes immediately after the scanning period TS1. Thus, T1 is equal to TS1. After the scanning period TS1, the first period T1 may include a retention period for further retaining the second transparent voltage.

In transparent scanning, a scanning signal may be simultaneously supplied to all the scanning lines G. Even in this case, the second transparent voltage can be written to each pixel PX.

The second period T2 includes sub-frame periods T2R, T2G and T2B. In the example shown in FIG. 17, the sub-frame periods T2R, T2G and T2B are arranged in this order after the first period T1. However, they may be arranged in a different order. In the second period T2, the timing generator 50 performs the display scanning of each color by controlling the frame memory 51, the line memories 52R, 52G and 52B and the data converter 53 with a data synchronization signal DE or by using the detection unit 55 and the first and second tables TB1 and TB2 of the memory 56, etc.

The sub-frame period T2R includes a scanning period TSR and a retention period THR. In the scanning period TSR, the gate drivers GD1 and GD2 supply a scanning signal to the scanning lines G1 to Gn in series. Further, while a scanning signal is supplied, the source driver SD applies signal line voltage Vsig to the signal lines S1 to Sm in accordance with the red sub-frame data (R_DATA) stored in the line memory 52R. More specifically, an operation for simultaneously applying, to the signal lines S1 to Sm, signal line voltage Vsig having a gradation corresponding to each pixel PX of each line to which a scanning signal is supplied is repeated.

By this operation, voltage is written between the pixel electrode 11 of each pixel PX and the common electrode 21 in accordance with red sub-frame data. In the second period T2, the signal line voltage Vsig applied to each pixel electrode 11 through the signal lines S1 to Sm has a polarity different from that of the common voltage Vcom of the common electrode 21, or is reference voltage Vsig-c. Thus, the voltage written to each pixel PX is greater than or equal to 8V and less than or equal to 16V. The retention period THR is a period which starts after the completion of writing to all the pixels PX and continues until the sub-frame period T2G comes. In the retention period THR, the red light-emitting element LSR lights up. Thus, a red image is displayed in the display area DA.

The operation in the sub-frame periods T2G and T2B is the same as the sub-frame period T2R. The sub-frame period T2G includes a scanning period TSG and a retention period THG. In the scanning period TSG, voltage is written to each pixel PX in accordance with the green sub-frame data (G_DATA) stored in the line memory 52G. In the retention period THG, the green light-emitting element LSG lights up. In this way, a green image is displayed in the display area DA. The sub-frame period T2B includes a scanning period TSB and a retention period THB. In the scanning period TSB, voltage is written to each pixel PX in accordance with the blue sub-frame data (B_DATA) stored in the line memory 52B. In the retention period THB, the blue light-emitting element LSB lights up. In this way, a blue image is displayed in the display area DA.

In a frame period F, the image data to be displayed in the next frame period F is written to the frame memory 51. Further, the sub-frame data of the line memories 52R, 52G and 52B in which writing to the pixels PX is completed is rewritten in sub-frame data corresponding to the image data written to the frame memory 51.

As the red, green and blue images displayed by time division in the sub-frame periods T2R, T2G and T2B of the second period T2 are mixed, the images are viewed as an image of multicolor display by the user. In the first period T1, the second transparent voltage less than voltage corresponding to the minimum value of gradation is applied between the pixel electrode 11 of each pixel PX and the common electrode 21. By repeating this first period T1 for each frame, the transparency of the display area DA is increased, thereby improving the visibility of the background of the display area DA.

The transparency of the display area DA is increased with increasing proportion of the first period T1 to each frame period F. However, the visibility of an image may be decreased. In consideration of these factors, the length of the first period T1 is, for example, preferably less than or equal to half the length of each frame period F. However, when a significance is placed on transparency, the proportion of the first period T1 to each frame period F may be further increased. The sub-frame periods T2R, T2G and T2B may have, for example, the same length. The color chromaticity of the image to be displayed may be adjusted by differentiating the proportions of the sub-frame periods T2R, T2G and T2B from each other.

Now, this specification explains the display operation of a frame period when the characters CH1 are displayed as shown in FIG. 12, using the display operation of FIG. 17.

In the first period T1, the controller CNT applies the second transparent voltage to the first liquid crystal layer 30C, the second liquid crystal layer 30D and the third liquid crystal layer 30E, and turns off all the light-emitting elements LSR, LSG and LSB in the light source unit LU. Subsequently, in the second period T2, the controller CNT applies the second transparent voltage to the third liquid crystal layer 30E of the non-object area NOA. In at least one of the sub-frame periods T2R, T2G and T2B, the controller CNT applies scattering voltage to, of the object area OA, the first liquid crystal layer 30C of the first area A1 in which the characters are displayed and the second liquid crystal layer 30D of the second area A2 equivalent to the peripheral area of the characters. In the retention period THR of the sub-frame period T2R, the controller CNT lights up the light-emitting element LSR and turns off the other light-emitting elements LSG and LSB. In the retention period THG of the sub-frame period T2G, the controller CNT lights up the light-emitting element LSG and turns off the other light-emitting elements LSR and LSB. In the retention period THB of the sub-frame period T2B, the controller CN1 lights up the light-emitting element LSB and turns off the other light-emitting elements LSR and LSG.

Now, this specification explains a case where polarity inversion is applied to the above display operation.

As shown in FIG. 8, scattering voltage comprises the positive first scattering voltage and the negative second scattering voltage. When the characters CH1 are displayed in the first area A1, the controller CNT alternately applies the first scattering voltage and the second scattering voltage to the first liquid crystal layer 30C of the first area A1 depending on the frame period. When the background color is applied to the second area A2 in connection with the display of the characters CH1 in the first area A1, the controller CNT alternately applies the first scattering voltage and the second scattering voltage to the first liquid crystal layer 30D of the second area A2 depending on the frame period. To cause the non-object area NOA to be in a transparent state in connection with the display of the characters CH1 in the first area A1, the controller CNT applies the second transparent voltage to the third liquid crystal layer 30E of the non-object area NOA in each frame period.

A plurality of first periods T1 may be included in each frame period F. FIG. 18 is a timing chart showing an example of display operation in which each frame period includes a plurality of first periods T1.

The first period T1 is provided at the head of each frame period F. In addition, the first period T1 is provided between the sub-frame periods T2R and T2G and between the sub-frame periods T2G and T2B. In this case, in all of the first periods T1, the second transparent voltage is written, and all the light-emitting elements LSR, LSG and LSB are turned off. However, in each first period T1, the second transparent voltage is written to all the pixels, and the liquid crystal layer 30 of all the pixels is in a transparent state. Therefore, the light-emitting elements LSR, LSG and LSB may light up.

The three first periods T1 have, for example, the same length. However, they may have different lengths. To achieve both the transparency and the visibility of an image, the total length of the three first periods T1 is preferably less than or equal to half the length of each frame period F. However, when a significance is placed on transparency, the proportion of the first periods T1 to each frame period F may be further increased.

Figure 19:
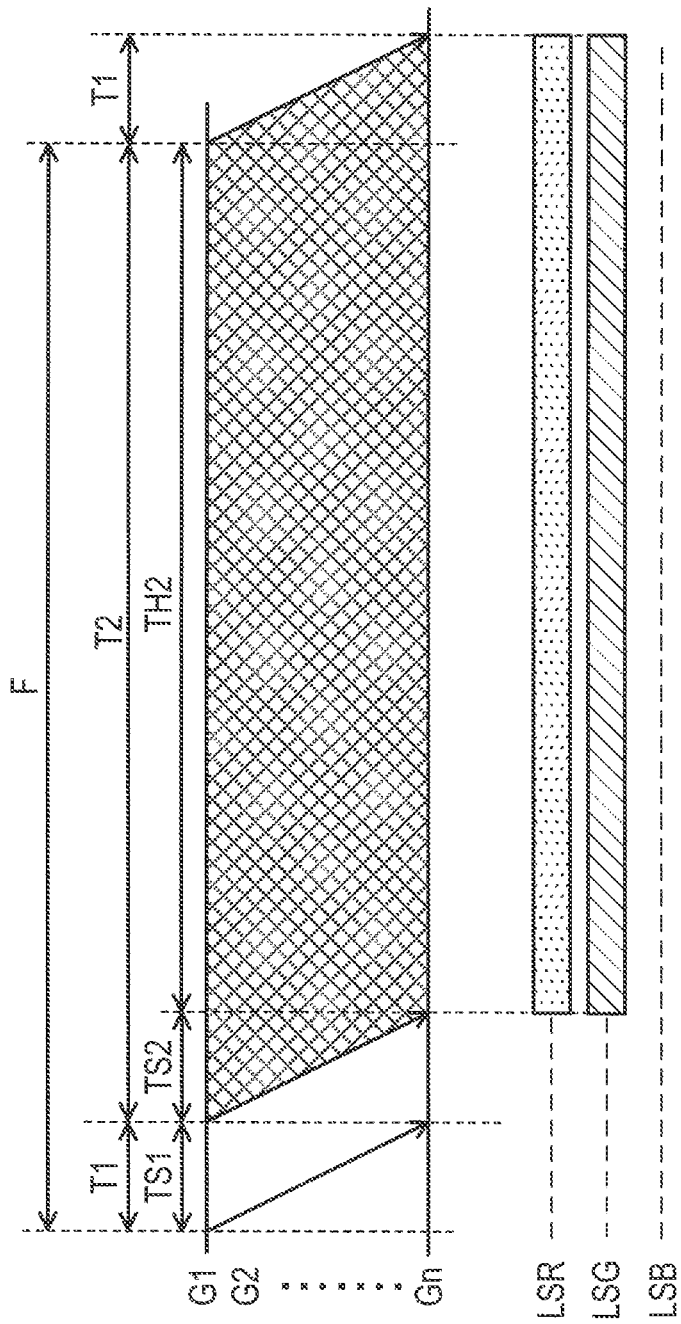
FIG. 19 is a timing chart showing another example of display operation.

The display device DSP may perform display operation using a single light source color as well as a field sequential system. FIG. 19 is a timing chart showing an example of display operation using a single light source color.

The structure in which each frame period F includes the first period T1 and the second period T2 is common to the example shown in FIG. 19 and the example shown in FIG. 17. The example shown in FIG. 19 is different from the example shown in FIG. 17 in respect that none of the sub-frame periods T2R, T2G and T2B is included in the second period T2. The second period T2 includes a scanning period TS2 and a retention period TH2. In the scanning period TS2, voltage is written to each pixel PX in accordance with image data. In the retention period TH2, the voltage written to each pixel PX is retained.

Here, the first period and the scanning period are the periods required for the scanning of the scanning lines G1 to Gn. The retention period follows the first period or the scanning period. The retention period is the period continuing until the next first period or scanning period.

In the retention period TH2, light-emitting elements LS corresponding to the color of the image to be displayed light up. The light-emitting elements LS may continue to light up until the scanning of the scanning lines G1 to Gn in the first period T1 of the next frame period F is completed as shown in FIG. 19. Alternatively, the light-emitting elements LS may continue to light up only during the retention period TH2. In the example shown in FIG. 19, in a manner different from that of the above field sequential system, light-emitting elements in different colors do not light up in series in a frame period. Instead, at least one of the light-emitting elements LSR, LSG and LSB lights up such that a desired light source color is realized in a frame period.

In the example shown in FIG. 19, the red light-emitting element LSR and the green light-emitting element LSG light up. In this way, yellow as a light source color is obtained by mixing red and green. A yellow image is displayed in the display area DA. As the light-emitting elements LS are driven by the above PWM control, the colors of the light-emitting elements LS lighting up at the same time can be adjusted, thereby realizing various light source colors. For example, the lighting period of the green light-emitting element LSG can be shorter than the lighting period of the red light-emitting element LSR in a frame period. In display scanning, only one of the light-emitting elements LSR, LSG and LSB may light up. Alternatively, three of them may light up at the same time.

The display device DSP may be configured to switch the display operation shown in FIG. 17 to FIG. 19 based on, for example, the control signal input from outside. The display device DSP may be set in advance so as to perform the display operation shown in one of FIG. 17 to FIG. 19.

Figure 20:
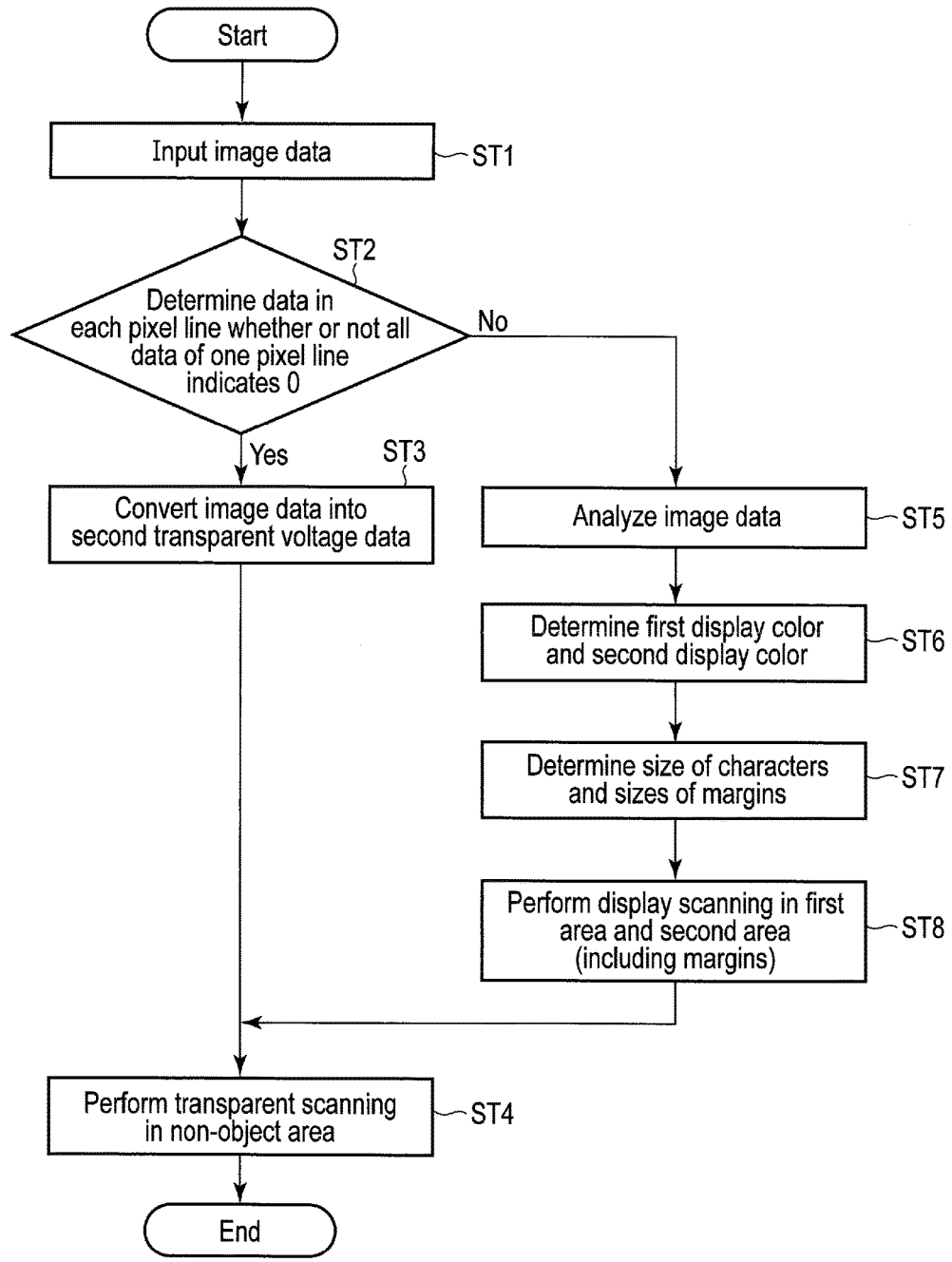
FIG. 20 is a flowchart showing an example of a process according to the present embodiment.

Now, this specification explains an example of the process performed by the controller CNT shown in FIG. 3 and the timing controller TC shown in FIG. 11, referring to FIG. 20.

When image data is input to the timing controller TC, the image data is stored in the frame memory 51 and is input to the detection unit 55 (step ST1). The detection unit 55 determines, of the image data, the data input in each pixel line, and determines whether or not all the data of one pixel line indicates 0 (step ST2). In other words, the detection unit 55 determines whether or not the voltage to be written to all the pixels PX of one pixel line is the second transparent voltage.

When the detector 55 determines that all the data of one pixel line indicates 0 (YES in step ST2), the detection unit 55 causes the data conversion unit 53 to convert the image data of a corresponding pixel line into second transparent voltage data (0V transparent) (step ST3). The second transparent voltage data is data for setting the voltage written to all the pixels PX of one pixel line to the second transparent voltage (=0V of liquid crystal application voltage). An example of the pixel line set to the second transparent voltage is the pixel line PXL4 of the non-object area NOA shown in FIG. 13. The controller CNT performs transparent scanning in the non-object area NOA (step ST4). The second transparent voltage is written to the pixels PX of the pixel lines included in the non-object area NOA.

When the detection unit 55 determines that all the data of one pixel line does not indicate 0 (NO in step ST2), the detection unit 55 analyzes the image data (step ST5). In this analyzing process, the detection unit 55 obtains the color information of characters included in the image data and the size information of the characters. The detection unit 55 refers to the first table TB1 stored in the memory 56, determines the first display color C1 based on the obtained color information, and determines the second display color C2 corresponding to the first display color C1 (step ST6). The detection unit 55 refers to the second table TB2 stored in the memory 56, determines the size of the characters based on the obtained size information, and determines the sizes of the margins provided in the upper and lower areas than the characters. In other words, the detection unit 55 determines the first number (m) of pixel lines, and determines the second number (n1) of pixel lines and the third number (n2) of pixel lines corresponding to the first number (m) of pixel lines (step ST7). In this way, the first area A1 and the second area A2 as the object area OA are determined. Both the information related to the first and second display colors C1 and C2 determined in step ST5 and the information related to the first number (m) of pixel lines, the second number (n1) of pixel lines and the third number (n2) of pixel lines determined in step ST6 are reflected in the data conversion unit 53.

The controller CNT performs display scanning in the first area A1 and the second area A2. Thus, the first area A1 is displayed in the first display color, and the second area A2 is displayed in the second display color (step ST8). In this display scanning, as explained with reference to FIG. 8, scattering voltage or the first transparent voltage (8V) is applied to each pixel PX of the pixel lines.

With regard to, of the second area A2, the pixel lines of the first and third portions A21 and A23 shown in FIG. 13, all the data of each pixel line is determined as 0 in step ST2. However, when these pixel lines are included in the margins in the determination of the sizes of the margins in step ST6, the second transparent voltage is not written to each pixel PX of the pixel lines included in the margins. The second area A2 in which display scanning is performed in step ST8 includes the first and third portions A21 and A23 which are set as margins although all the data of each pixel line indicates 0. Thus, the controller CNT performs display scanning in the first portion A21 and the third portion A23.

The controller CNT performs transparent scanning in the non-object area NOA, excluding the first area A1 and the second area A2 (including margins) (step ST4).

According to the above present embodiment, as described above, it is possible to increase the visibility of the background in the object area A1 and decrease the visibility of the characters and the peripheral area of the characters in the non-object area A2. Thus, the visibility of the background through the display device DSP can be increased.

When characters are displayed in the display device DSP, the transparency of the peripheral area of the characters is decreased, the visibility of the background through the display device DSP is decreased. Further, the peripheral area is displayed in a color different from that of the characters. In this way, the visibility of the characters CH1 can be improved. It is possible to obtain the display device DSP capable of improving the visibility of the background and the display quality.

In the structure of the present embodiment, the display device DSP can be driven by using a source driver in which the voltage is low. This effect is explained with reference to FIG. 6 and FIG. 8.

This specification assumes a comparison example in which common voltage Vcom is DC voltage, and polarity inversion is applied to only signal line voltage Vsig based on common voltage Vcom as the center. In this case, when signal line voltage Vsig is substantially equal to common voltage Vcom, substantially 0V of voltage can be written to each pixel PX in normal display scanning. However, in this comparison example, to use the scattering voltage of FIG. 6 for gradation reproduction, signal line voltage Vsig must be variable in a range of −16V to +16V relative to common voltage Vcom. The circuits such as the source driver SD need to have a withstand voltage of 32V.

In the structure of the present embodiment, as shown in FIG. 8, signal line voltage Vsig and common voltage Vcom may be variable in a range of, for example, 16V. Signal line voltage Vsig and common voltage Vcom may be variable with ±8V relative to 8V of reference voltage. Thus, a withstand voltage of 16V is sufficient for the circuits such as the source driver SD. By decreasing the withstand voltage of the circuits, the sizes of the circuits and the manufacturing costs can be reduced. Various desirable effects can be obtained from the present embodiment other than the above description.

Now, this specification explains drive examples in the present embodiment. Here, the following case is explained. The first display color C1 of the first area A1 explained with reference to FIG. 13 is yellow. The second display color C2 of the second area A2 is blue. The first number (m) of pixel lines constituting the first area A1 and the second portion A22 is 20. The second number (n1) of pixel lines constituting the first portion A21 is 10. The third number (n2) of pixel lines constituting the third portion A23 is 10. The display area DA is assumed to include pixel lines corresponding to n scanning lines G1 to Gn. The 10 pixel lines constituting the first portion A21 are electrically connected to the scanning lines G1 to G10, respectively. The 20 pixel lines constituting the first area A1 and the second portion A22 are electrically connected to the scanning lines G11 to G30, respectively. The 10 pixel lines constituting the third portion A23 are electrically connected to the scanning lines G31 to G40, respectively. Pixel lines corresponding to the scanning lines G41 to Gn constitute the non-object area NOA.

(First Drive Example of First Embodiment)

Figure 21A:
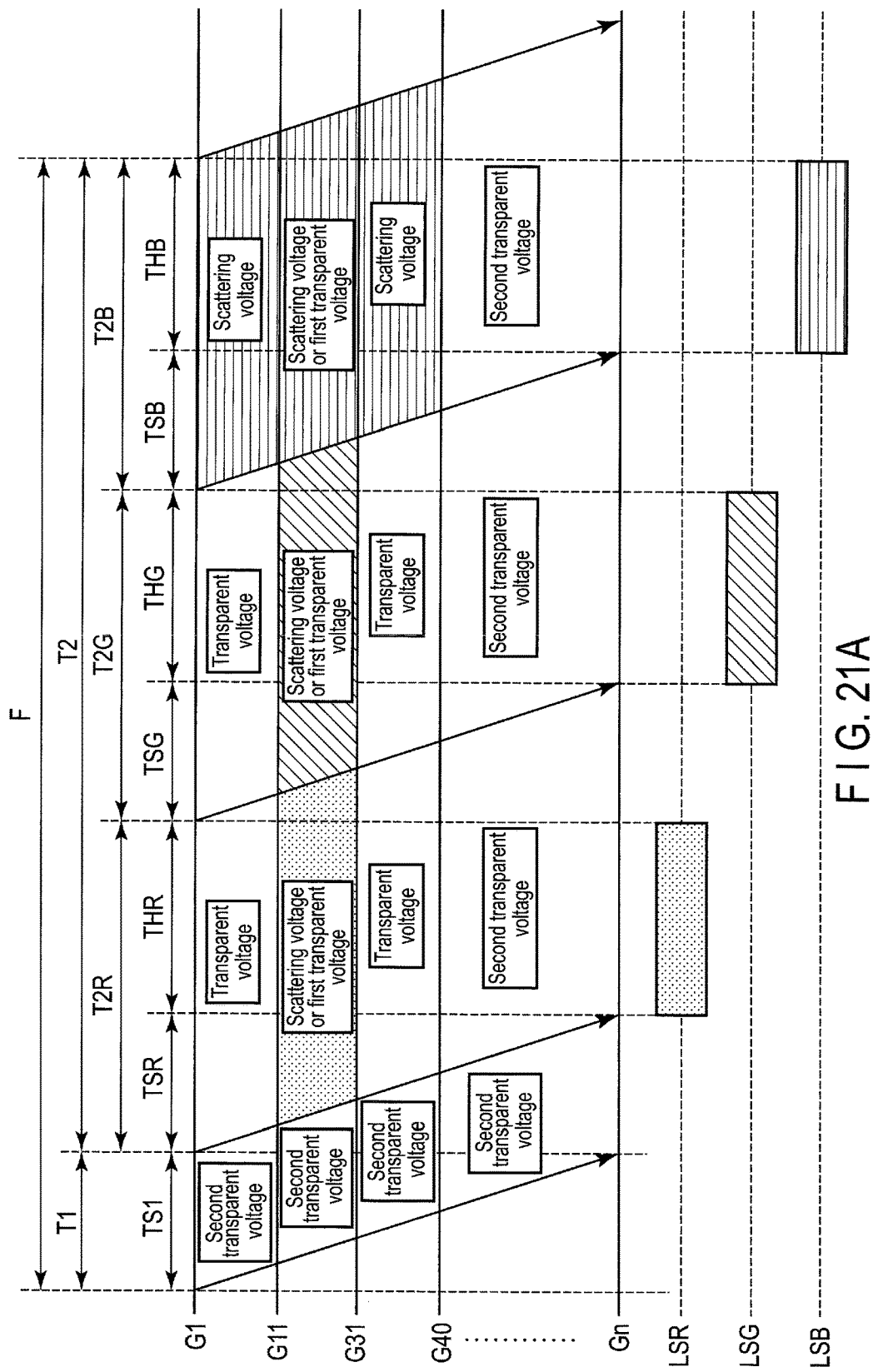
FIG. 21A is a timing chart showing a first drive example.

As shown in FIG. 21A, a frame period F includes the first period T1 and the second period T2. The first period T1 includes the scanning period TS1. The second period T2 includes the sub-frame periods T2R, T2G and T2B. The sub-frame period T2R includes the scanning period TSR and the retention period THR. The sub-frame period T2G includes the scanning period TSG and the retention period THG. The sub-frame period T2B includes the scanning period TSB and the retention period THB.

In the first period T1, while a scanning signal is supplied to the scanning lines G1 to Gn, the second transparent voltage (0V) is applied to the pixels electrically connected to these scanning lines G1 to Gn.

In the scanning period TSR, transparent voltage (0V to 8V) is applied to the pixels electrically connected to the scanning lines G1 to G10. Scattering voltage or the first transparent voltage (8V) is applied to the pixels connected to the scanning lines G11 to G30. Transparent voltage (0V to 8V) is applied to the pixels electrically connected to the scanning lines G31 to G40. The second transparent voltage (0V) is applied to the pixels electrically connected to the scanning lines G41 to Gn.

In the retention period THR, the light-emitting element LSR lights up. Thus, red light is scattered in, of the pixels electrically connected to the scanning lines G11 to G30, the pixels to which scattering voltage is applied, in other words, the pixels located in the first area A1. Transparent voltage is applied to the other pixels, in other words, the pixels located in the second area A2. Thus, red light is hardly scattered in the pixels located in the second area A2.

In a manner similar to that of the scanning period TSR, in the scanning period TSG, transparent voltage (0V to 8V) is applied to the pixels electrically connected to the scanning lines G1 to G10. Scattering voltage or the first transparent voltage (8V) is applied to the pixels electrically connected to the scanning lines G11 to G30. Transparent voltage (0V to 8V) is applied to the pixels electrically connected to the scanning lines G31 to G40. The second transparent voltage (0V) is applied to the pixels electrically connected to the scanning lines G41 to Gn. The transparent voltage applied to the pixels electrically connected to the scanning lines G31 to G40 may be any one of the first transparent voltage (8V), the second transparent voltage (0V) and voltage between the first transparent voltage and the second transparent voltage.

In the retention period THG, the light-emitting element LSG lights up. Thus, green light is scattered in, of the pixels electrically connected to the scanning lines G11 to G30, the pixels to which scattering voltage is applied. Green light is hardly scattered in the other pixels to which transparent voltage is applied.

In the scanning period TSB, scattering voltage is applied to the pixels electrically connected to the scanning lines G1 to G10. Scattering voltage or the first transparent voltage (8V) is applied to the pixels electrically connected to the scanning lines G11 to G30. Scattering voltage is applied to the pixels electrically connected to the scanning lines G31 to G40. The second transparent voltage (0V) is applied to the pixels electrically connected to the scanning lines G41 to Gn.

In the retention period THB, the light-emitting element LSB lights up. Thus, blue light is scattered in, of the pixels electrically connected to the scanning lines G1 to G40, the pixels to which scattering voltage is applied, in other words, the pixels located in the second area A2. Transparent voltage is applied to the other pixels, in other words, the pixels located in the first area A1. Thus, blue light is hardly scattered in the pixels located in the first area A1.

According to the above first drive example, the first area A1 scatters red light and green light. Thus, yellow as the first display color C1 is applied to the characters. The second area A2 scatters blue. Thus, blue as the second display color C2 is applied to the peripheral area of the characters. The second transparent voltage is applied to the scanning lines G41 to Gn and is retained in the entire frame period F. Thus, the corresponding non-object area NOA maintains a high transparency.

(Second Drive Example of First Embodiment)

Figure 21B:
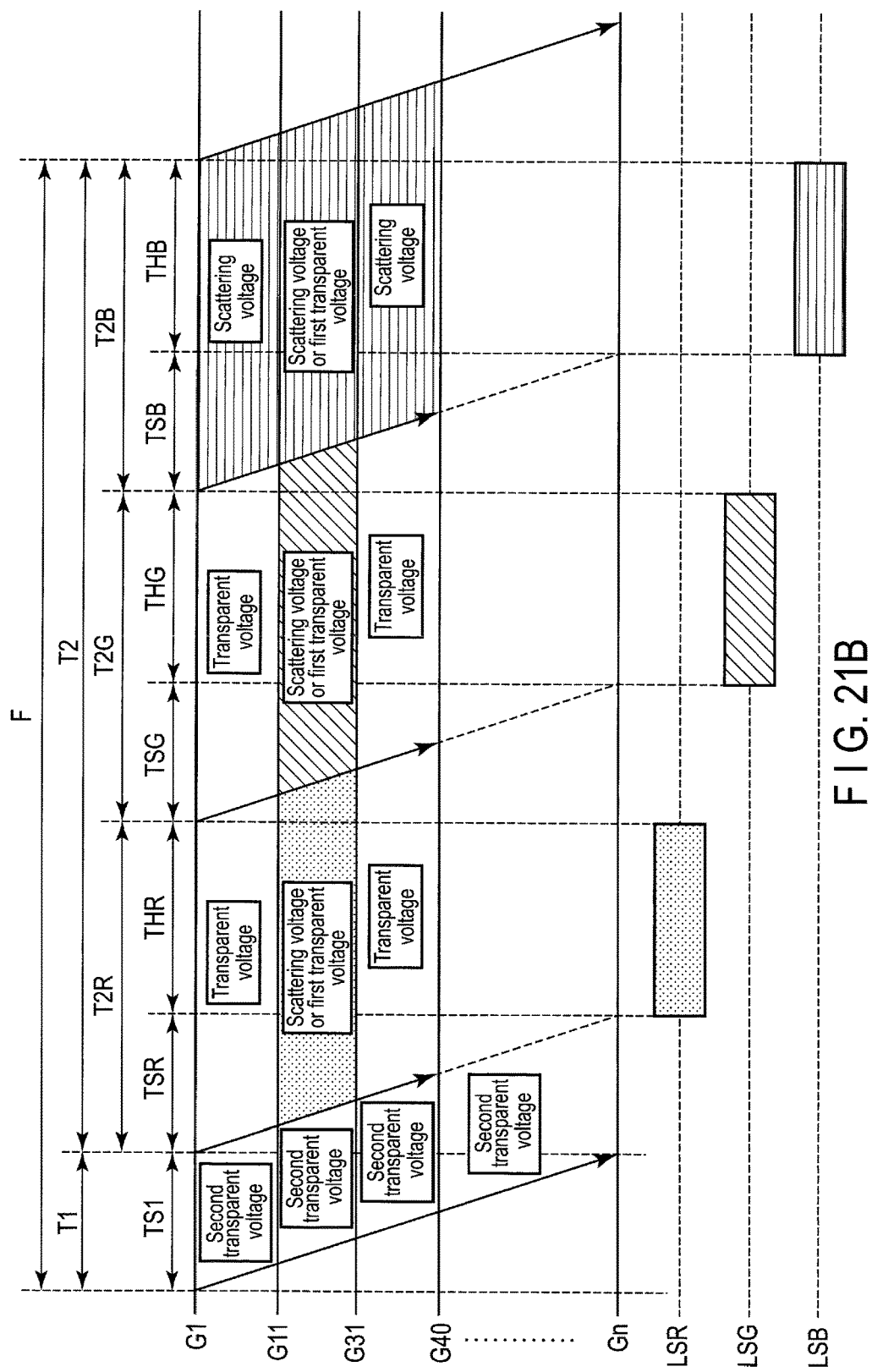
FIG. 21B is a timing chart showing a second drive example.

The second drive example shown in FIG. 21B is different from the first drive example in respect that the pixels of the non-object area are not driven in any of the scanning periods TSR, TSG and TSB although the pixels of the first and second areas A1 and A2 are driven in the periods.

More specifically, in the first period T1, the second transparent voltage (0V) is applied to the pixels electrically connected to the scanning lines G1 to Gn.

In the scanning periods TSR and TSG, transparent voltage (0V to 8V) is applied to the pixels electrically connected to the scanning lines G1 to G10. Scattering voltage or the first transparent voltage (8V) is applied to the pixels electrically connected to the scanning lines G11 to G30. Transparent voltage (0V to 8V) is applied to the pixels electrically connected to the scanning lines G31 to G40. The transparent voltage applied to the pixels electrically connected to the scanning lines G1 to G10 and the pixels electrically connected to the scanning lines G31 to G40 may be any one of the first transparent voltage (8V), the second transparent voltage (0V) and voltage between the first transparent voltage and the second transparent voltage. The pixels electrically connected to the scanning lines G41 to Gn retain the second transparent voltage (0V) applied in the first period T1. Thus, after the first period T1, the operation for applying voltage to the pixels electrically connected to the scanning lines G41 to Gn can be skipped.

In the scanning period TSB, scattering voltage is applied to the pixels electrically connected to the scanning lines G1 to G10. Scattering voltage or the first transparent voltage (8V) is applied to the pixels electrically connected to the scanning lines G11 to G30. Scattering voltage is applied to the pixels electrically connected to the scanning lines G31 to G40. The pixels electrically connected to the scanning lines G41 to Gn retain the second transparent voltage (0V) applied in the first period T1.

Effects similar to those of the first drive example can be obtained from the second drive example. Further, it is possible to reduce the drive power of the display device DSP since the operation for applying voltage to some pixels is skipped.

(Third Drive Example of First Embodiment)

Figure 21C:
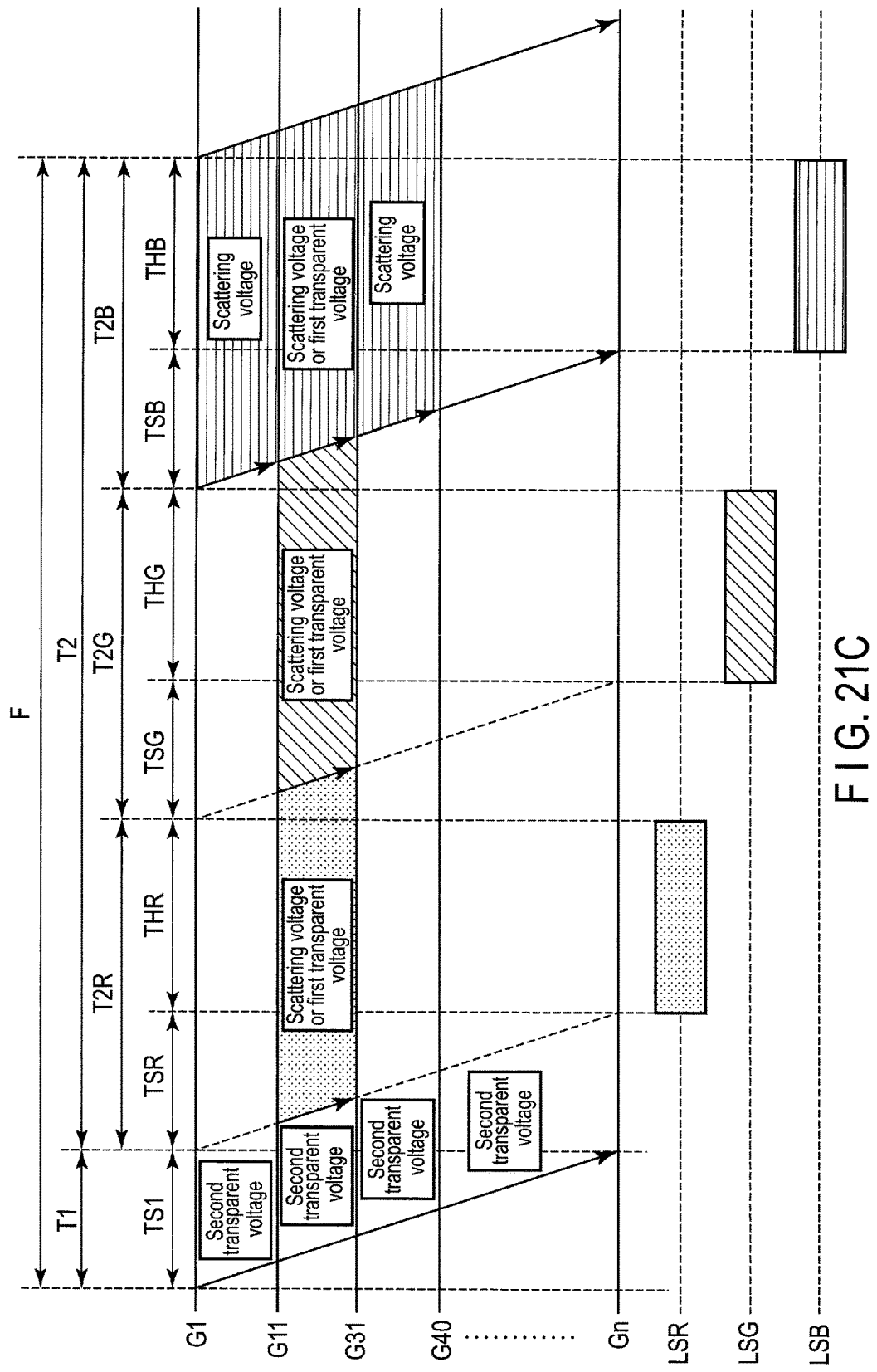
FIG. 21C is a timing chart showing a third drive example.

The third drive example shown in FIG. 21C is different from the second drive example in respect that neither the pixels of the first portion A21 nor the pixels of the third portion A23 in the second area A2 are driven in each of the scanning periods TSR and TSG.

More specifically, in the first period T1, the second transparent voltage (0V) is applied to the pixels electrically connected to the scanning lines G1 to Gn.

In the scanning periods TSR and TSG, the second transparent voltage (0V) applied in the first period T1 is retained in the pixels electrically connected to the scanning lines G1 to G10, the pixels electrically connected to the scanning lines G31 to G40 and the pixels electrically connected to the scanning lines G41 to Gn. Thus, after the first period T1, the operation for applying voltage to the pixels electrically connected to the scanning lines G1 to G10, the pixels electrically connected to the scanning lines G31 to G40 and the pixels electrically connected to the scanning lines G41 to Gn can be skipped. Scattering voltage or the first transparent voltage (8V) is applied to the pixels electrically connected to the scanning lines G11 to G30.

In the scanning period TSB, scattering voltage is applied to the pixels electrically connected to the scanning lines G1 to G10. Scattering voltage or the first transparent voltage (8V) is applied to the pixels electrically connected to the scanning lines G11 to G30. Scattering voltage is applied to the pixels electrically connected to the scanning lines G31 to G40. The pixels electrically connected to the scanning lines G41 to Gn retain the second transparent voltage (0V) applied in the first period T1.

Effects similar to those of the first drive example can be obtained from the third drive example. Further, it is possible to further reduce the drive power of the display device DSP since the operation for applying voltage to some pixels is further skipped.

(Modification Example of First Embodiment)

Figure 22:
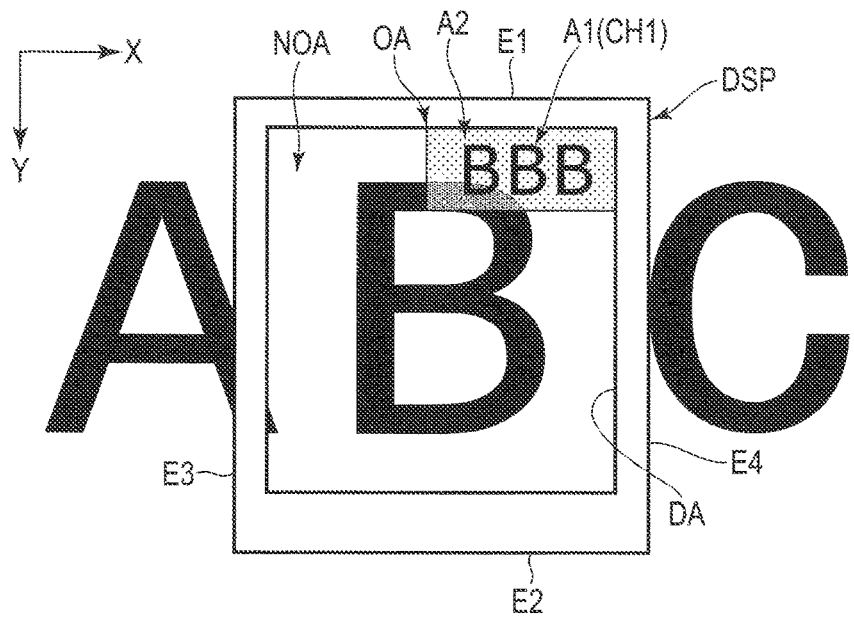
FIG. 22 is a plan view of the display device DSP according to a modification example.

The modification example shown in FIG. 22 is different from the example shown in FIG. 12 in respect that the object area OA does not include the entire area of the pixel lines in which the first area A1 is located. In the example shown in FIG. 22, the object area OA is located on, of the display area DA, a side close to the end portion E4 in the first direction X and a side close the end portion E1 in the second direction Y. In the display area DA, the area indicated with dots is equivalent to the second area A2. The characters "B" surrounded by the second area A2 are equivalent to the first area A1. The first area A1 and the second area A2 are equivalent to the object area OA. In the display area DA, the other area is equivalent to the non-object area NOA.

The object area OA is explained in more detail with reference to FIG. 23.

The object area OA comprises the first area A1 equivalent to the characters CH1, and the second area A2 equivalent to the peripheral area of the first area A1. The second area A2 is equivalent to the entire area indicated with dots in FIG. 23, and comprises the first portion A21, the second portion A22 and the third portion A23. The first portion A21, the second portion A22 and the third portion A23 are arranged in this order in the second direction Y. The first area A1 and the second portion A22 are arranged in the first direction X. The first portion A21 is located in the upper area than the first area A1. The third portion A23 is located in the lower area than the first area A1. The second portion A22 is equivalent to the area other than the first area A1 between the first portion A21 and the third portion A23. The second portion A22 comprises a front area A223 located on the front side of the character string "BBB" arranged in the first direction X and a rear area A224 located on the rear side of the character string "BBB".

The non-object area NOA comprises a third area A3 and a fourth area A4. The third area A3 is adjacent to the third portion A23. The third area A3 and the third portion A23 are arranged in the second direction Y. The fourth area A4 is adjacent to the second area A2. Of the second area A2, the first portion A21, the front area A223 and the third portion A23 are adjacent to the fourth area A4 in the first direction X.

A plurality of pixel lines constitute the object area OA and the non-object area NOA. More specifically, at least one pixel line including the pixel line PXL1 constitutes the first portion A21 and the fourth area A4. At least one pixel line including the pixel line PXL2 constitutes the first area A1, the second portion A22 and the fourth area A4. At least one pixel line including the pixel line PXL3 constitutes the third portion A23 and the fourth area A4. A plurality of pixel lines including the pixel line PXL4 constitute the third area A3. As explained with reference to FIG. 13, a plurality of pixel electrodes 11 or pixels PX arranged in the first direction X constitute each of the pixel lines PXL1 to PXL4.

The first number (m) of pixel lines constituting the first area A1 and the second portion A22 is determined in accordance with the size CS of the characters CH1. The second number (n1) of pixel lines constituting the first portion A21 and the third number (n2) of pixel lines constituting the third portion A23 are determined in accordance with the size MS1 of the upper margin and the size MS2 of the lower margin required in accordance with the size CS of the characters CH1 based on a third table TB3 as described later. A first number (n3) of pixels constituting the front area A223 and a second number (n4) of pixels constituting the rear area A224 are determined in accordance with the size MS3 of the front margin and the size MS4 of the rear margin required in accordance with the size CS of the characters CH1 based on the third table TB3 described later.

Figure 24:
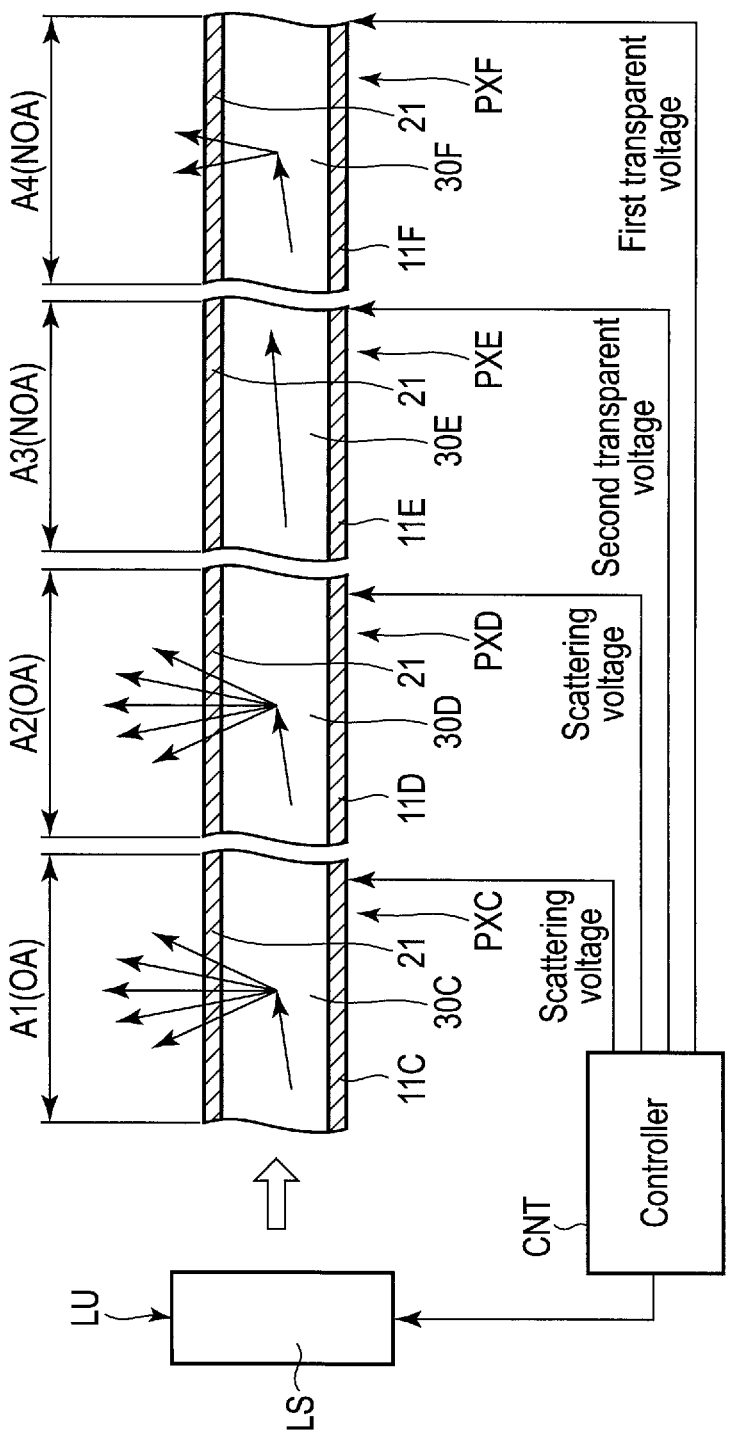
FIG. 24 is a cross-sectional view of the display panel shown in FIG. 22.

FIG. 24 only shows, of the display panel PNL, a portion necessary for explanation.

The first pixel PXC located in the first area A1 includes the first pixel electrode 11C, the first liquid crystal layer 30C, the common electrode 21, etc. The second pixel PXD located in the second area A2 includes the second pixel electrode 11D, the second liquid crystal layer 30D, the common electrode 21, etc. The third pixel PXE located in the third area A3 includes the third pixel electrode 11E, the third liquid crystal layer 30E, the common electrode 21, etc. A fourth pixel PXF located in the fourth area A4 includes a fourth pixel electrode 11F, a fourth liquid crystal layer 30F, the common electrode 21, etc.

For example, the first pixel electrode 11C, the second pixel electrode 11D and the fourth pixel electrode 11F constitute the same pixel line (the pixel line PXL2 shown in FIG. 13), and are electrically connected to the same scanning line G of the scanning lines G. The third pixel electrode 11E constitutes a pixel line (the pixel line PXL4 shown in FIG. 13) different from that of the first pixel electrode 11C, etc., and is electrically connected to another scanning line G of the scanning lines G.

The controller CNT applies scattering voltage to the first liquid crystal layer 30C and the second liquid crystal layer 30D, applies the second transparent voltage (0V) to the third liquid crystal layer 30E, and applies the first transparent voltage (8V) to the fourth liquid crystal layer 30F.

Figure 23:
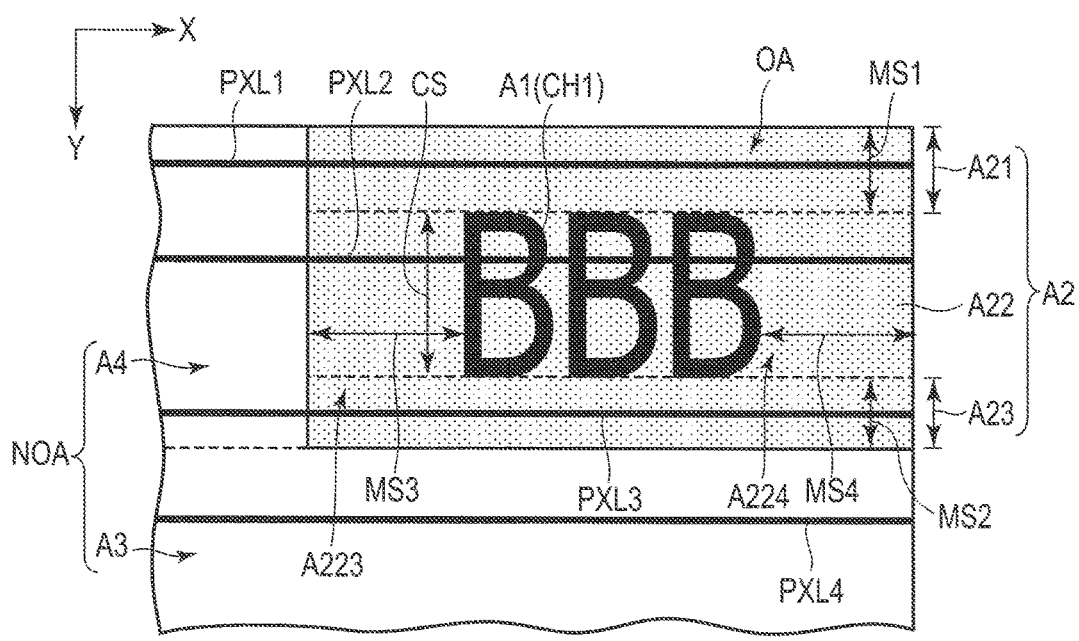
FIG. 23 is shown for explaining the object area OA shown in FIG. 22.

Of the pixels constituting the pixel lines PXL1 and PXL3 shown in FIG. 23, the pixels PX located in the first portion A21 or the third portion A23 are structured in the same manner as that of the second pixel PXD. Scattering voltage is applied to the pixels PX located in the first portion A21 or the third portion A23 in the same manner as that of the second liquid crystal layer 30D. Of the pixels constituting the pixel lines PXL1 and PXL3, the pixels PX located in the fourth area A4 are structured in the same manner as that of the fourth pixel PXF. The first transparent voltage is applied to the pixels PX located in the fourth area A4 in the same manner as that of the fourth liquid crystal layer 30F.

Thus, the first area A1 scatters, of the light emitted from the light source unit LU, light in a partial color. Thus, the characters CH1 are displayed in the first display color C1. The second area A2 including the first portion A21, the second portion A22 and the third portion A23 scatters, of the light emitted from the light source unit LU, light in a partial color. Thus, the peripheral area of the characters CH1 is displayed in the second display color C2. The third liquid crystal layer 30E is transparent. Thus, the third liquid crystal layer 30E hardly scatters the light emitted from the light source unit LU. The fourth liquid crystal layer 30F is almost transparent. However, the transparency of the fourth liquid crystal layer 30F is less than that of the third liquid crystal layer 30E.

In this modification example, similarly, the user can easily view the characters CH1.

FIG. 25 shows an example of the third table TB3.

In comparison with the second table TB2 shown in FIG. 16, the third table TB3 includes the first number (n3) of pixels and the second number (n4) of pixels in addition to the first number (m) of pixel lines, the second number (n1) of pixel lines and the third number (n2) of pixel lines. The first number (n3) of pixels corresponds to the width of the front area A223 in the first direction X, and the second number (n4) of pixels corresponds to the width of the rear area A224 in the first direction X, where n3 and n4 may be either the same integer or different integers.

The present embodiment described above may be applied to, as each character CH1, a letter including two separate portions in the second direction Y such as "i" in addition to a continuous letter "B". These two portions may be regarded as the first area displayed in the first display color. The portion around the two portions may be regarded as the second area displayed in the second display color.

Figure 26:
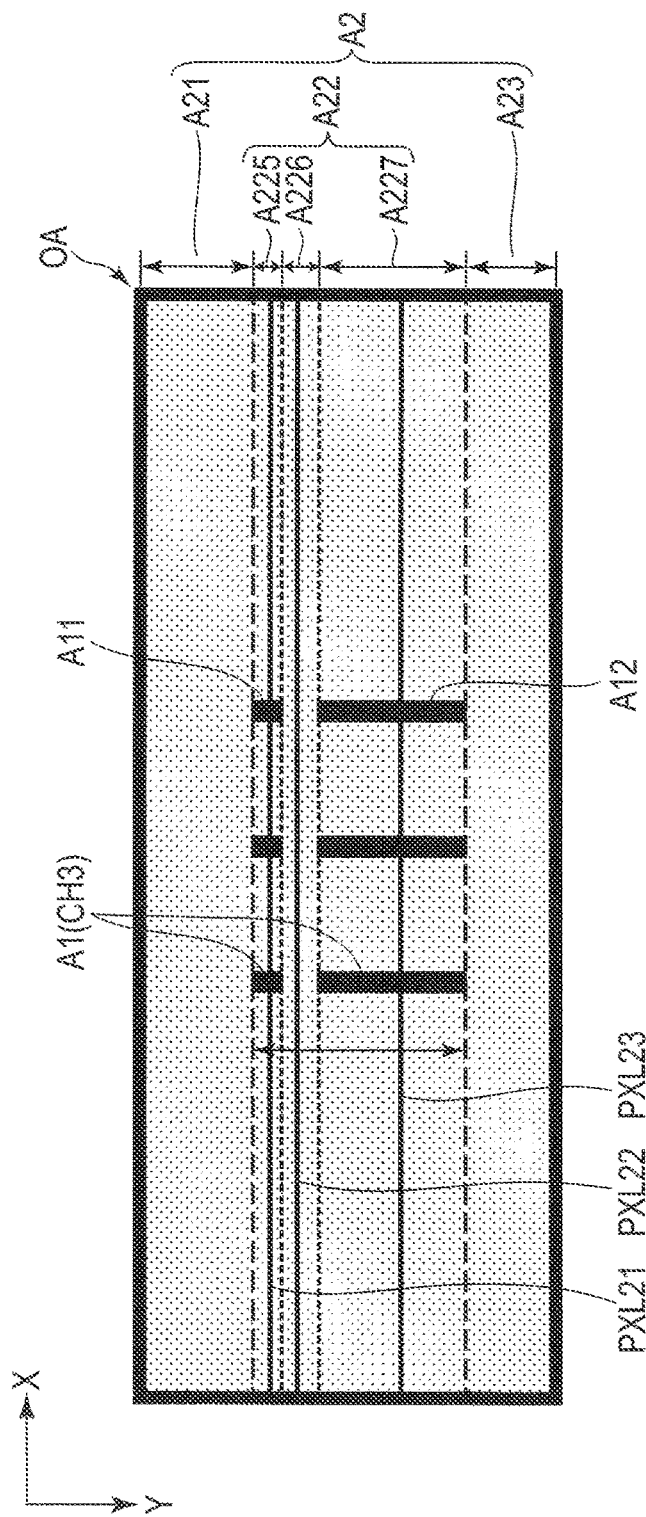
FIG. 26 is shown for explaining another object area OA.

The object area OA is explained in more detail with reference to FIG. 26.

The object area OA comprises the first area A1 equivalent to characters CH3 of the character string "iii", and the second area A2 equivalent to the peripheral area of the first area A1. The first area A1 comprises, of each character "i", portions A11 and A12 away from each other in the second direction Y. The second area A2 is equivalent to the entire area indicated with dots in FIG. 26, and comprises the first portion A21, the second portion A22 and the third portion A23. The second portion A22 comprises portions A225 to A227 arranged in the second direction Y. The portions A11 and A225 are arranged in the first direction X. The portions A12 and A227 are arranged in the first direction X. The portion A226 is located between the portions A11 and A12.

At least one pixel line including a pixel line PXL21 constitutes the portions A11 and A225. At least one pixel line including a pixel line PXL22 constitutes the portion A226. At least one pixel line including a pixel line PXL23 constitutes the portions A12 and A227.

In the object area OA, scattering voltage or the first transparent voltage is applied to the pixels PX of the pixel lines PXL21 and PXL23. With regard to the pixel line PXL22, all the data of the pixel line is determined as 0 in step ST2 shown in FIG. 20. However, the pixel line PXL22 is determined as a pixel line included in the second area A2. Thus, scattering voltage or the first transparent voltage is applied to the pixels PX of the pixel line.

In this manner, effects similar to those of the above description can be obtained.

Second Embodiment

In a second embodiment, differences from the first embodiment are mainly explained. The explanation of the same structures as the first embodiment is omitted.

Figure 27:
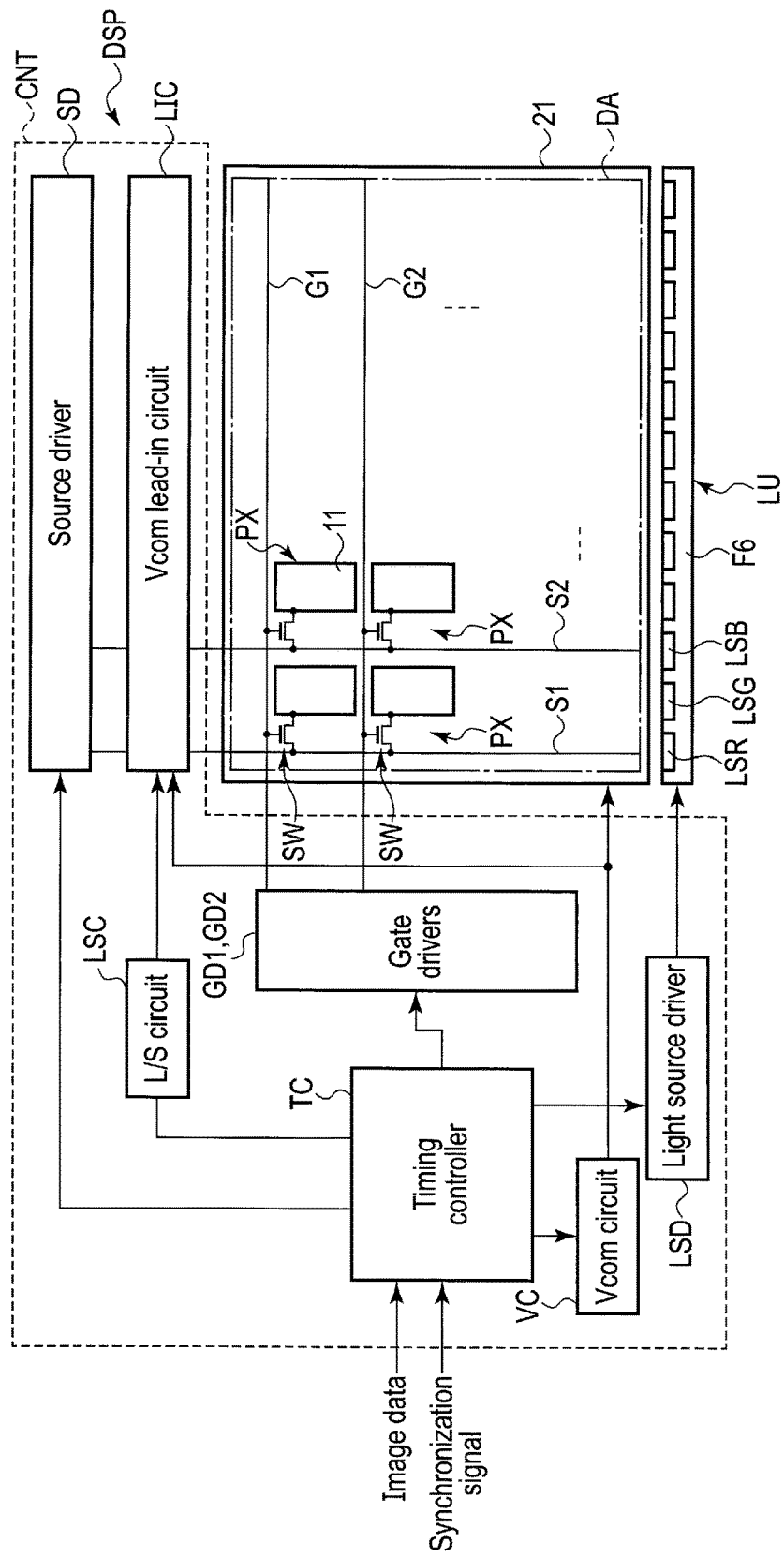
FIG. 27 shows the main structural components of a display device according to a second embodiment.

FIG. 27 shows the main structural components of a display device DSP according to the present embodiment.

The structure of the display device DSP is different from that of FIG. 3 in respect that a controller CNT comprises a level conversion circuit (L/S circuit) LSC and a Vcom lead-in circuit LIC.

The common voltage (Vcom) applied from a Vcom circuit VC is applied to a common electrode 21 and is also applied to the Vcom lead-in circuit LIC. The Vcom lead-in circuit LIC is interposed between a source driver SD and each signal line S. The Vcom lead-in circuit LIC supplies a video signal output from the source driver SD to each signal line S. The Vcom lead-in circuit LIC is also capable of applying the common voltage from the Vcom circuit VC to each signal line S.

FIG. 28 shows a structural example of the Vcom lead-in circuit LIC.

The Vcom lead-in circuit LIC comprises switching elements SW1 to SWm. The switching elements SW1 to SWm are provided on, for example, a first substrate SUB1 provided in a display panel PNL. A line LN1 is electrically connected to the input terminals (sources) of the switching elements SW1 to SWm. The signal lines S1 to Sm are electrically connected to the output terminals (drains) of the switching elements SW1 to SWm. A line LN2 is electrically connected to the control terminals (gates) of the switching elements SW1 to SWm.

The Vcom circuit VC shown in FIG. 27 applies common voltage Vcom to the line LN1. A timing controller TC outputs a control signal to the level conversion circuit LSC when transparent scanning is performed. The level conversion circuit LSC converts the control signal into voltage at a predetermined level, and supplies the control signal to the line LN2. When the control signal is supplied to the line LN2, the switching elements SW1 to SW2 transition to a conduction state (on-state). Thus, the line LN1 is electrically continuous with the signal lines S1 to Sm. The common voltage Vcom of the line LN1 is applied to the signal lines S1 to Sm. While the switching elements SW1 to SWm are in a conduction state, the output of the source driver SD is controlled so as to be high impedance by the signal from the timing controller.

When a scanning signal is supplied to scanning lines G1 to Gn in a state where common voltage Vcom is applied to the signal lines S1 to Sm, the common voltage Vcom of the signal lines S1 to Sm is applied to pixel electrodes 11. Thus, the potential difference between each pixel electrode 11 and the common electrode 21 is 0V (second transparent voltage).

Even in the structure of the present embodiment, transparent scanning similar to that of the first embodiment can be performed. Transparent scanning may be performed based on timing similar to that of the first embodiment. In the structure of the present embodiment, for example, there is no need to provide a circuit for applying voltage (for example, common voltage Vcom) for transparent scanning to the source driver SD.

The present invention is not limited to the embodiments described above. The constituent elements of the invention can be modified in various ways without departing from the spirit and scope of the invention. Various aspects of the invention can also be extracted from any appropriate combination of constituent elements disclosed in the embodiments. For example, some of the constituent elements disclosed in the embodiments may be deleted, and the constituent elements described in different embodiments may be arbitrarily combined.

In each embodiment, red, green and blue are examples of the first, second and third colors, respectively. The light-emitting elements LSR, LSG and LSB are examples of the first light-emitting element which emits light in the first color, the second light-emitting element which emits light in the second color and the third light-emitting element which emits light in the third color, respectively. The sub-frame data stored in the line memories 52R, 52G and 52B is examples of first sub-frame data indicating an image in the first color, second sub-frame data indicating an image in the second color and third sub-frame data indicating an image in the third color, respectively. The sub-frame periods T2R, T2G and T2B included in the second period T2 are examples of first, second and third sub-frame periods, respectively.

The first, second and third colors are not limited to red, green and blue, respectively. The number of types of light-emitting elements LS provided in the light source unit LU may be less than or greater than three. The number of line memories, sub-frame data and sub-frame periods may be increased or decreased in accordance with the number of types (colors) of light-emitting elements LS.

A normal mode polymer dispersed liquid crystal may be used for the liquid crystal layer 30. The liquid crystal layer 30 may be in a scattering state to decrease the transparency when liquid crystal application voltage is zero or less than predetermined voltage. The liquid crystal layer 30 may be in a transparent state to improve the visibility of the background through the display device DSP when liquid crystal application voltage is higher than the predetermined voltage.

What is claimed is:

1. A display device comprising:
    a display panel comprising:
        a display area comprising a first area and a second area surrounding the first area;
        a first pixel electrode located in the first area;
        a second pixel electrode located in the second area;
        a common electrode located in the display area; and
        a liquid crystal layer located in the display area and including a polymer dispersed liquid crystal;
    a light source unit comprising:
        a first light source which emits light in a first color toward the display panel; and
        a second light source which emits light in a second color different from the first color toward the display panel; and
    a controller which controls the display panel and the light source unit, wherein
    the display panel comprises an edge portion extending in a first direction,
    each of the first light source and the second light source comprises a light-emitting portion facing the edge portion in a second direction intersecting the first direction,
    the controller stores a first table indicating a combination of the first display color and the second display color,
    the controller determines the first display color of a character displayed in the first area based on image data, and determines the first display color and the second display color with reference to the first table such that the first display color and the second display color have different hues,
    the display panel transmits external light in the second area,
    the controller applies a scattering voltage between the common electrode and the first pixel electrode and between the common electrode and the second pixel electrode, and controls the light source unit, and
    the liquid crystal layer scatters light entering from the edge portion in a first display color in the first area, and scatters light entering from the edge portion in a second display color different from the first display color in the second area mixed with the external light that is transmitted through the display panel in the second area.

2. The display device of claim 1, wherein
    the first display color and the second display color are any one of the first color, the second color and a third color obtained by combining the first color and the second color.

3. The display device of claim 1, wherein
    the display area comprises a third area adjacent to the second area,
    the display panel comprises a third pixel electrode located in the third area,
    the controller applies a transparent voltage different from the scattering voltage between the common electrode and the third pixel electrode, and
    the liquid crystal layer is transparent in the third area.

4. The display device of claim 3, wherein
    the first pixel electrode and the second pixel electrode are located in a first pixel line, and
    the third pixel electrode is located in a second pixel line different from the first pixel line.

5. The display device of claim 3, wherein
    the display area comprises a fourth area adjacent to the second area,
    the second area and the fourth area are arranged in a first direction, and the second area and the third area are arranged in a second direction intersecting the first direction,
    the display panel comprises a fourth pixel electrode located in the fourth area,
    the controller applies the transparent voltage between the common electrode and the fourth pixel electrode, and
    the liquid crystal layer is transparent in the fourth area.

6. The display device of claim 5, wherein
    the first pixel electrode, the second pixel electrode and the fourth pixel electrode are located in a same pixel line.

7. The display device of claim 6, wherein
    the transparent voltage includes a first transparent voltage and a second transparent voltage less than the first transparent voltage, and
    the controller applies the second transparent voltage between the common electrode and the third pixel electrode, and applies the first transparent voltage between the common electrode and the fourth pixel electrode.

8. The display device of claim 1, wherein
    the second area comprises a first portion, a second portion adjacent to the first portion, and a third portion adjacent to the second portion,
    the first area and the second portion are arranged in a first direction,
    the first portion, the second portion and the third portion are arranged in this order in a second direction intersecting the first direction, and
    the controller stores a second table indicating a combination of a first number of pixel lines included in the first area and the second portion, a second number of pixel lines included in the first portion, and a third number of pixel lines included in the third portion.

9. The display device of claim 8, wherein
    the controller determines a size of the character displayed in the first area based on image data, and determines the first number of pixel lines, the second number of pixel lines and the third number of pixel lines with reference to the second table.

10. The display device of claim 1, wherein
a frame period comprises a first period and a second period, and
the controller
  applies the transparent voltage between the common electrode and the first pixel electrode and between the common electrode and the second pixel electrode in the first period, and
  applies the scattering voltage between the common electrode and the first pixel electrode and between the common electrode and the second pixel electrode in the second period.

11. The display device of claim 10, wherein
the controller turns off the first light source and the second light source in the first period, and lights up at least one of the first light source and the second light source in the second period.

12. The display device of claim 11, wherein
the second period comprises a first sub-frame period in which the first light source lights up, and a second sub-frame period in which the second light source lights up.

13. The display device of claim 1, wherein
the first display color is a complementary color of the second display color.

14. A display device comprising:
a display panel comprising:
  a display area comprising a first area, a second area surrounding the first area, and a third area adjacent to the second area;
  a first pixel electrode located in the first area;
  a second pixel electrode located in the second area;
  a third pixel electrode located in the third area;
  a common electrode located in the display area; and
  a liquid crystal layer located in the display area and including a polymer dispersed liquid crystal;
a light source unit comprising:
  a first light source which emits light in a first color toward the display panel; and
  a second light source which emits light in a second color different from the first color toward the display panel; and
a controller which controls the display panel and the light source unit, wherein
the display panel comprises an edge portion extending in a first direction,
each of the first light source and the second light source comprises a light-emitting portion facing the edge portion in a second direction intersecting the first direction,
the controller determines a first display color in the first area based on image data, and determines a second display color such that the first display color and the second display color have different hues,
the display panel transmits external light in the second area and in the third area,
the controller applies a scattering voltage between the common electrode and the first pixel electrode and between the common electrode and the second pixel electrode, applies a transparent voltage different from the scattering voltage between the common electrode and the third pixel electrode, and controls the light source unit,
the liquid crystal layer scatters light entering from the edge portion in the first display color in the first area, scatters light entering from the edge portion in the second display color different from the first display color in the second area mixed with the external light that is transmitted through the display panel in the second area, and is transparent in the third area to transmit the external light through the display panel in the third area.

* * * * *